United States Patent [19]
Bonissone et al.

[11] Patent Number: 6,078,911
[45] Date of Patent: Jun. 20, 2000

[54] COMPILATION OF RULE BASES FOR FUZZY LOGIC CONTROL

[75] Inventors: Piero Patrone Bonissone; James Baldwin Comly; Mark Edward Dausch, all of Schenectady, N.Y.

[73] Assignee: General Electric Company, Schenectady, N.Y.

[21] Appl. No.: 08/288,154

[22] Filed: Aug. 10, 1994

Related U.S. Application Data

[63] Continuation of application No. 07/775,873, Oct. 15, 1991, abandoned.

[51] Int. Cl.$^7$ .................................................. G06F 15/18
[52] U.S. Cl. ................................................. 706/52; 706/46
[58] Field of Search ................................. 395/3, 11, 51, 395/61, 900, 911; 706/46, 52

[56] References Cited

U.S. PATENT DOCUMENTS

| | | | |
|---|---|---|---|
| 4,860,213 | 8/1989 | Bonissone . | |
| 4,961,225 | 10/1990 | Hisano | 395/61 |
| 5,012,430 | 4/1991 | Sakurai | 395/61 |
| 5,022,498 | 6/1991 | Sasaki et al. | 395/900 |
| 5,025,499 | 6/1991 | Inoue et al. | 395/61 |
| 5,051,932 | 9/1991 | Inoue et al. | 395/61 |
| 5,058,033 | 10/1991 | Bonissone et al. | 395/51 |
| 5,067,374 | 11/1991 | Sakai et al. | 395/900 |
| 5,081,598 | 1/1992 | Bellows et al. | 395/911 |
| 5,099,428 | 3/1992 | Takahashi | 395/900 |
| 5,156,013 | 10/1992 | Arima et al. | 395/61 |
| 5,165,011 | 11/1992 | Hisano | 395/61 |
| 5,245,695 | 9/1993 | Basehore | 395/900 |
| 5,263,120 | 11/1993 | Bichkel | 395/900 |

OTHER PUBLICATIONS

"Analysis of a Fuzzy Logic Controller", by W.J.M. Kickert & E.H. Mamadani, Fuzzy Set and Systems, 12:29–44, 1978.

"The Implementation of Fuzzy Algorithms for Control", by D.A. Rutherford & G.C. Bloore, Proceedings of the IEEE, 64(4):572–573, 1976.

"Fuzzy Sets", by L.A. Zadeh, Information and Control, 8:338–353, 1965.

"Time–Constrained Reasoning Under Uncertainty", by Piero P. Bonissone & Pete C. Halverson, Journal of Real Time Systems, 2:22–45, May 1990.

"OPS, A Domain–Independent Production System Language", by C. Forgy & J. McDermott, In Proc. Fifth Intern. Conf. on Artificial Intelligence, pp. 933–939, 1977.

"Rete: A Fast Algorithm for the Many Pattern/Many Object Patter Match Problem", by Charles L. Forgy, Journal of Artificial Inteligence, 19(1):17–37, Sep. 1982.

Chiueh, "Optimization of fuzzy logic inference architecture"; Computer, vol. 25 Iss. 5, pp. 67–71, May 1992.

Watanabe et al, "VLSI fuzzy chip and inference accelerator board systems", Proceedings of the Twenty–First International Symposium on Multiple–valued logic, pp. 120–127, May 26–29, 1991.

Yamguchi, "Fuzzy adaptive control with an associative memory system", International Conference on Control '91, pp. 944–949 vol. 2, Mar. 25–28, 1991.

*Primary Examiner*—Tariq R. Hafiz
*Attorney, Agent, or Firm*—Dave C. Goldman; Jill M. Breedlove

[57] ABSTRACT

A fuzzy logic controller is compiled into values in a look-up table such that the table may be used for adjusting a process dependent upon the state variables. The look-up table may be generated by use of a Mean of Maxima (MOM) technique for defuzzification. Alternately, an approximate Height Method (HM) may be used to provide defuzzification. The MOM and HM techniques allow fuzzy logic control without executing any rules in run-time. A further alternative uses an exact height method and minimizes the number of rules which are executed in run time.

12 Claims, 14 Drawing Sheets

| RULE 1: | IF TEMPERATURE IS LOW AND PRESSURE IS LOW THEN THROTTLE IS HIGH | | |
|---|---|---|---|
| STATE DESCRIPTION | | | ACTION |
| TEMPERATURE (T) | PRESSURE (P) | | THROTTLE |
| LOW | LOW | | HIGH |

| RULE 1: | IF TEMPERATURE IS LOW AND PRESSURE IS MEDIUM THEN THROTTLE IS MEDIUM | | |
|---|---|---|---|
| STATE DESCRIPTION | | | ACTION |
| TEMPERATURE (T) | PRESSURE (P) | | THROTTLE |
| LOW | MEDIUM | | MEDIUM |

*fig. 2*

$$\Pi(A_i | A') = \underset{x}{MAX} (\min (\mu_{A_i}(x), \mu_{A'}(x)))$$

RULE 1: IF TEMPERATURE IS LOW AND PRESSURE IS LOW THEN THROTTLE IS HIGH

| STATE DESCRIPTION | | DEGREE OF RULE APPLICA-BILITY | ACTION |
|---|---|---|---|
| TEMPERATURE (T) | PRESSURE (P) | | THROTTLE |
| LOW — INPUT FOR T | LOW — INPUT FOR P | | HIGH |

RULE 2: IF TEMPERATURE IS LOW AND PRESSURE IS MEDIUM THEN THROTTLE IS MEDIUM

| STATE DESCRIPTION | | DEGREE OF RULE APPLICA-BILITY | ACTION |
|---|---|---|---|
| TEMPERATURE (T) | PRESSURE (P) | | THROTTLE |
| LOW — INPUT FOR T | INPUT FOR P — MEDIUM | | MEDIUM |

INPUTS: INPUT FOR T, INPUT FOR P

*fig. 5*

| RULE | TEMP. | PRESSURE | THROTTLE |
|---|---|---|---|
| R1 | LOW | LOW | HIGH |
| R2 | LOW | MEDIUM | MEDIUM |
| R3 | LOW | HIGH | MID-LOW |
| R4 | MEDIUM | LOW | MID-HIGH |
| R5 | MEDIUM | MEDIUM | MID-LOW |
| R6 | MEDIUM | HIGH | LOW |
| R7 | HIGH | LOW | MID-LOW |
| R8 | HIGH | MEDIUM | LOW |
| R9 | HIGH | HIGH | VERY-LOW |

*fig. 8a*

| PRESSURE / TEMP. | LOW | MEDIUM | HIGH |
|---|---|---|---|
| LOW | R1 THROTTLE: HIGH | R1 THROTTLE: MEDIUM | R1 THROTTLE: MID-LOW |
| MEDIUM | R1 THROTTLE: MID-HIGH | R1 THROTTLE: MID-LOW | R1 THROTTLE: LOW |
| HIGH | R1 THROTTLE: MID-LOW | R1 THROTTLE: LOW | R1 THROTTLE: VERY-LOW |

*fig. 8b*

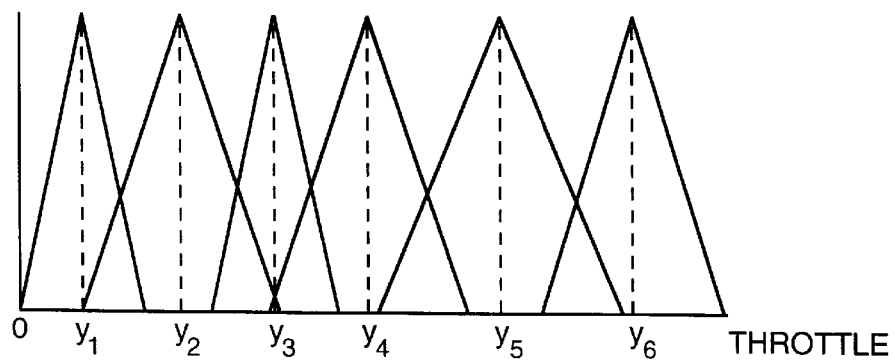

*fig. 9* fig. 10
| RULE | OUTPUT | $y^*$ |
|---|---|---|
| R1 | $\mu Y_i(y)$ = HIGH | $y_6$ |
| R2 | $\mu Y_i(y)$ = MEDIUM | $y_4$ |
| R3 | $\mu Y_i(y)$ = MID-LOW | $y_3$ |
| R4 | $\mu Y_i(y)$ = MID-HIGH | $y_5$ |
| R5 | $\mu Y_i(y)$ = MID-LOW | $y_3$ |
| R6 | $\mu Y_i(y)$ = LOW | $y_2$ |
| R7 | $\mu Y_i(y)$ = MID-LOW | $y_3$ |
| R8 | $\mu Y_i(y)$ = LOW | $y_2$ |
| R9 | $\mu Y_i(y)$ = VERY-LOW | $y_1$ |
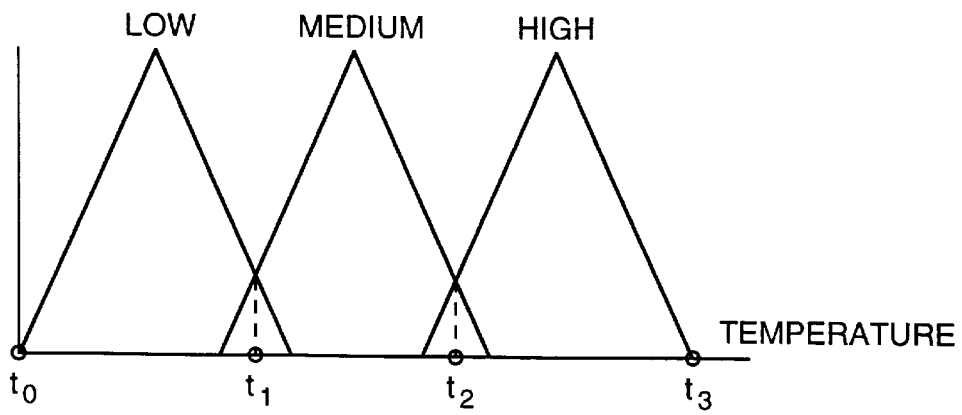
fig. 11a
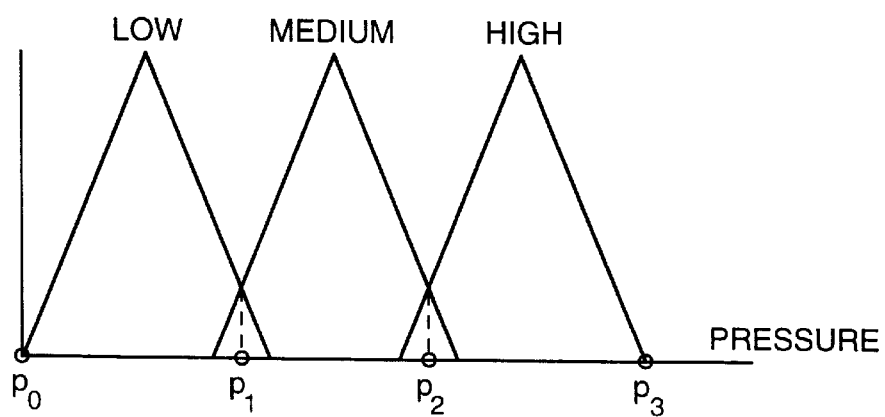
fig. 11b

COMPILATION OF RULE BASES FOR FUZZY LOGIC CONTROL

This application is a Continuation of application Ser. No. 07/775,873 filed Oct. 15, 1991, now abandoned.

BACKGROUND OF THE INVENTION

This invention relates to fuzzy logic control.

The use of controllers for controlling various processes has become increasingly common. Such controllers may, for example, be used to control temperature and pressure so as to improve the performance of a chemical process. Controllers have been used to control welding and for controlling numerous other operations and machines.

Traditional controllers are developed based upon a mathematical model of the open-loop process to be controlled, following classical control theory techniques. Typically traditional controllers require the use of rather accurate (and therefore) expensive sensors to monitor the output of the process. This precision is required by the control algorithm that has been synthesized from a model of the process. Such a traditional controller is shown in block diagram FIG. 1A and relies upon one or more actuators to respond to the output generated by the controller in order to maintain the process operating in a satisfactory manner.

As shown by prior art block diagram FIG. 1B, fuzzy logic controllers have previously been used for the control of processes. Such fuzzy logic controllers (FLC) are knowledge based systems in which the knowledge of process operators or product engineers has been used to synthesize a closed loop controller for the process. Such FLCs are typically derived from a knowledge acquisition process, but may be automatically synthesized from a self-organizing control architecture. In either case, the result of the synthesis is a rule or knowledge base (KB) rather than an algorithm. The KB consists of a set of fuzzy rules which are used by an interpreter having a quantification (or fuzzification) stage, an inference engine (or fuzzy matcher), and a defuzzification stage.

The quantification makes the input to the controller (generated by the sensor) dimensionally compatible with the left-hand side (LHS) of the rules. The inference engine matches the LHS of all the rules with the input, determines the partial degree of matching of each relevant rule, and aggregates the weighted output of the relevant rules, generating a possibility distribution of values on the output space. The defuzzification summarizes this distribution into a point which is used by the actuator as the resulting control action.

The sensors used by an FLC may be less expensive and less precise than the sensors used by a traditional controller due to the different value granularity with which the control laws are expressed in the knowledge base of the FLC.

The use of an interpreter in an FLC generally requires a continuous evaluation of all the rules in the knowledge base every time that there is a change in the input. Such FLCs have therefore required a relatively large amount of memory and a relatively large amount of processing power in order to perform the large number of computations quickly enough to control a real-time process. Complex structures are often required.

It may be useful to briefly discuss the concept of fuzziness even though a relatively large number of papers have dealt with this concept since it was introduced in a 1965 paper by Zadeh entitled "Fuzzy Sets" appearing in *Information and Control*, 8:338–353.

Fuzziness is based upon a type of uncertainty and it is useful to compare it to randomness. In randomness, there is uncertainty arising from the non-deterministic membership of a point in the sample space to a well-defined region in that space. The sample space represents the set of possible values for a random variable. The well-defined region represents an event. The region's characteristic function creates a dichotomy in the universe of discourse of the possible values for the random variable. When the point falls within the boundary of the region, it fully belongs to the region. Otherwise, the point's membership in the region is zero. Probability measures the tendency or frequency with which a random variable takes values inside the region. An example would be flipping a fair coin and knowing that the probability is 50% that the outcome will be heads. Even though there is a probability associated with that event, the outcome of the event either fully belongs to the region (the region might correspond to the outcome being heads) or is completely outside such a region (when the outcome is tails).

In fuzziness, the uncertainty is derived from the partial membership of a point in the universe of discourse to an imprecisely defined region in that space. The region represents a fuzzy set. For example, if the space is all temperatures and the region is temperatures which are much greater than 32°, the region is a fuzzy set. The characteristic function of the fuzzy set does not create a dichotomy in the universe of discourse. It maps the universe of discourse (i.e., all temperatures in the given example) into the interval $[0,1]$ (0 representing non-membership in the group and 1 representing membership in the group) instead of the set 0,1. The partial membership of the point does not represent any frequency. It defines the degree to which that particular value of the universe of discourse satisfies the property which characterizes the fuzzy set. Thus, the characteristic function of the set of temperatures much greater than 32° would have a value of 0 when the temperature is 32°. The characteristic function of that fuzzy set would have a value of 1 at some temperature such as, for example, 500°. At some value in between those two extremes, such as 100°, the value of the characteristic function would be somewhere between 0 and 1, the value corresponding to the extent to which 100° is considered much greater than 32°.

A fuzzy subset A of a universe of discourse U is defined by its membership or characteristic function $\mu_A(U)$. This function maps any point $\mu \epsilon U$ into the unit interval:

$$\mu_A(U):U \rightarrow [0,1]$$

Before proceeding further to discuss several basic concepts, it is noted that definitions and notations will be explained throughout, but it may be useful for readers to refer to a summary of definitions which is included near the end of the detailed description portion of this document.

A fuzzy production rule is a mapping from a fuzzy state vector into a fuzzy control action. An example of a fuzzy production rule, taken from common-sense driving knowledge is:

If the visibility is poor, and the pavement is slippery, then the car speed is (i.e., should be) very low.

The terms poor, slippery, very low are all fuzzy descriptions of the values of state variables and actions.

A fuzzy rule-set is the union of such fuzzy production rules. An example of a fuzzy rule set is a collection of rules determining the appropriate driving speed under different visibility and pavement conditions.

More formally, let us assume that we have a rule set R, which is composed of m rules $r_i$, i.e.:

$$R = \bigcup_{i=1}^{m} r_i \qquad (1)$$

and that each rule $r_i$ defines a mapping between a fuzzy state vector $X_i$ and a corresponding fuzzy action $Y_i$:

$$r_i: \bar{X}_i \rightarrow Y_i \qquad (2)$$

Let us assume that the state vector is composed of n state variables:

$$\bar{X}_i = [X_{i,1}, X_{i,2}, \ldots, X_{i,n}] \qquad (3)$$

Each state variable $X_i = X_{i,j}$, i=1, ..., m, j=1, ..., n takes as value a fuzzy set defined on its corresponding universe of discourse $X_j$ whose base variable is $x_j$. The action $Y_i$ is assigned as a value a fuzzy set defined on the universe of discourse of actions Y, characterized by the base variable y. Then each rule $r_i$ can be written as $$r_i = \mu_{x_{i,1}}(X_1) \times \mu_{x_{1,2}}(X_2) \times \ldots \times \mu_{x_{i,n}}(X_n) \times \mu_{Y_i}(y) \qquad (4)$$

where the symbol x indicates the Cartesian product operation. FIG. 2 illustrates an example with two fuzzy rules (m=2), in which each state vector has two state variables (n=2) and one output. Each rule is of the type:

[Temperature,Pressure]→Throttle

Among prior papers related to fuzzy logic controllers is the 1978 paper of Kickert and Mamdani entitled "Analysis of a Fuzzy Logic Controller" appearing in *Fuzzy Set and Systems*, 12:29–44 and the 1976 Rutherford et al. article entitled "The Implementation of Fuzzy Algorithms for Control" appearing in *Proceedings of the IEEE*, 64(4) :572–573.

The Kickert paper provides an analysis of an FLC with one state variable, one output, and using the Mean of Maxima (MOM) used as a defuzzification method. Under a few additional assumptions, this paper shows the equivalence of this FLC to a multi-level relay. The paper then uses this equivalence to replace the FLC with the describing function approximation of the multi-level relay. A stability analysis is then performed upon the closed-loop system. This presentation appears limited to an FLC with one state variable as the paper indicates that for higher order systems (i.e., for a state vector with more than one state variable), the concept of a describing function does not exist.

The rather short Rutherford article discusses the compilation of a knowledge base for a two-state variable FLC using a mean of maxima (MOM) technique. Both papers are based on the assumption that the universes of discourse of the state variables are discretized, i.e. quantized.

Knowledge based systems, often called expert systems, are problem solving systems whose intelligent behavior is mostly based on declarative rather than procedural knowledge. These systems derive their conclusions from explicit knowledge (i.e., knowledge basis), rather than from hard-coded algorithms.

Although the prior art fuzzy logic controller discussed above with respect to FIG. 1B is a type of knowledge based system, a knowledge based system is not necessarily a fuzzy system.

The compilation process in a knowledge based system usually refers to the process of translation of variables, predicates, and rules into a dependency graph. Such a graph can be used to keep a pointer for all rules containing the same variable and for all variables effected by the same rule, thus eliminating the need of run-time search. The graph can also maintain the current evaluation of each rule, allowing for incremental rule evaluation when new information is entered. An example of rule compilation is the RETE network discussed by Forgy in the September 1982 article entitled "RETE: A Fast Algorithm for the Many Pattern/Many Object Pattern Match Problem" appearing in *Journal of Artificial Intelligence*, 19(1):17–37. The RETE network was developed to improve the performance of programs discussed in Forgy et al's 1977 article entitled "OPS, A Domain-Independent Production System Language" appearing in *Proceedings of the Fifth International Conference on Artificial Intelligence*, pages 933–939.

Another rule compiler is described in the May 1990 article of Bonissone et al entitled "Time-Constrained Reasoning Under Uncertainty" in *Journal of Real Time Systems*, 2:22–45. This rule compiler is described in Bonissone et al. U.S. patent application Ser. No. 396,407 filed Aug. 19, 1990, Docket No. RD-18,497, assigned to the assignee of the present application. The translator/compiler is used to take an existing RUM knowledge base as described in Bonissone U.S. Pat. No. 4,860,213 issued on Aug. 22, 1989, based on KEE™, and compile it to a more efficient internal representation, replacing KEE units with specific instances of low-level data structures. The translator derives and analyzes the rule network topology, creating a directed acyclic graph which represents the rule dependencies as a compiled network. It also creates the links between the declarative part of the knowledge base (captured by the rule dependency graph) and the procedural part of the knowledge base (captured by both user/defined and system predicates).

Beyond knowledge based systems, the compilation process in programming language refers to translation of statements from a high level source language into a low level target language, such as assembly language or machine language, to allow for efficient execution. Alternately, an interpreter can be used to execute each individual statement of the high level source language without recurring to compilation (although typically the interpreter will translate the high level language to some intermediate code designed to minimize the time needed to analyze each statement in order to execute it).

OBJECT AND SUMMARY OF THE INVENTION

Accordingly, it is a primary object of the present invention to provide a new and improved fuzzy logic controller.

A more specific object of the present invention is to provide a fuzzy logic controller which is relatively simple in construction and low in cost.

A further object of the present invention is to provide a fuzzy logic controller which uses a relative small amount of memory.

A still further object of the present invention is to provide a fuzzy logic controller which may quickly respond to changed output conditions without requiring a large amount of processing power.

Yet another object of the present invention is to provide a fuzzy logic controller which is compiled, but which is equivalent in performance to an interpreted fuzzy logic controller.

The above and other objects of the present invention which will become more apparent when the following detailed description is considered are realized by a fuzzy logic control system. The control system includes a means for receiving sensed input values corresponding to at least two continuously defined state variables of a process which is to be controlled and a memory having a look-up table stored therein at a plurality of memory locations. Each of the plurality of memory locations has a stored value representative of the output from operation of a fuzzy logic rule base when the state variables have values corresponding to the address of that memory location. A means for generating an address dependent on the sensed input values and reading out a stored value and a means for supplying the read-out stored value to an actuator acting on the process are provided.

In a mean of maxima (MOM) embodiment, each stored value is representative of the output from executing a single corresponding rule of the fuzzy logic rule base. Each memory location corresponds to a partition in state space in which the corresponding rule is dominant. The boundaries between adjacent partitions are defined by points of intersection between adjacent terms in a termset. Each stored value is representative of a mean of maxima defuzzification of outputs from rule executions.

In an alternate embodiment, an approximate height method is used. Some stored values are representative of the output from executing a single corresponding rule and other stored values are dependent on the outputs from executing a corresponding plurality of rules. Some of the memory corresponds to a partition in state space in which a corresponding rule is the only rule having a non-zero output and the other of the memory locations each correspond to a partition in state space where each of the corresponding plurality of rules has a non-zero output. Note that some memory locations may correspond to more than one partition in state space. Boundaries between adjacent partitions are defined by points at which a characteristic function of a term of the termset becomes zero. The stored value is representative of an approximate height method defuzzification of outputs from rule executions.

The compiled fuzzy logic control system may be connected to control a process and the control system may further include at least two sensors sensing state variables of the process and operably connected to the means for receiving. The system may further include an actuator for acting on the process dependent on the stored values which are read out and operably connected to the means for supplying.

The method of the present invention may be described as including the establishing of a look-up table in a memory for fuzzy logic control of a process. The establishing includes dividing a continuously defined state space of at least two state variables into partitions, each partition associated with a zone (area, volume, or n-space where n is the number of state variables) of values of the state variables. For each partition, an output is generated from execution of at least one applicable rule from a fuzzy logic rule base and dependent upon the associated zone of values of the state variables. The output is stored at memory locations within a memory, each memory location corresponding to at least one partition and having an address corresponding to the zone of values of the state variables which are associated with that partition. Each output is operable for controlling an actuator acting on a process which is to be controlled.

The method may further include controlling a process by substeps including operably connecting the memory to at least two sensors which sense two state variables of the process, generating an address dependent on the values of the state variables, reading out an output from the address, and supplying the output to an actuator acting on the process for controlling the process.

One embodiment generates the output by means of maxima defuzzification of outputs from rule executions. In that case, each output is generated by executing a single corresponding rule of the fuzzy logic rule base. Each output is stored in a memory location corresponding to a partition in which the single corresponding rule is dominant. Boundaries between adjacent partitions are defined by points of intersection between adjacent terms in a termset.

In another embodiment of the method, the output is generated by using an approximate height method defuzzification of outputs from rule executions. In that embodiment, the output is generated for some partitions by executing a single corresponding rule of the fuzzy logic rule base and the output is generated for other partitions by executing a corresponding plurality of rules of the fuzzy logic rule base. Some of the memory corresponds to a partition in state space in which a corresponding rule is the only rule with a non-zero output and other of the memory locations each correspond to partitions in state space where each of a corresponding plurality of rules has a non-zero output. Boundaries between adjacent partitions are defined by points at which a characteristic function of a term of the termset becomes zero.

The method may be alternately described as including establishing a look-up table in a memory for fuzzy logic control of a process by substeps including dividing a continuously defined state space of at least two state variables into partitions, each partition associated with a zone of values of the state variables. A compilation value is generated for each partition dependent on applicable rules from a fuzzy logic rule base and dependent upon the associated zone of values of the state variables. The compilation value is stored at memory locations within a compilation memory, each memory location corresponding to at least one partition. Each of the memory locations of the compilation memory then has a stored value corresponding to at least one partition at an address corresponding to each zone of values of the state variables associated with each corresponding partition. The compilation memory is operably connected to a process which is to be controlled. Values of at least two state variables of the process are sensed. The compilation memory is then addressed at an address dependent on the sensed values to output the compilation value. The compilation value is used to control at least one actuator acting on the process to provide fuzzy logic control of the process without run-time execution of any rule having a zero output for the sensed values.

In an approximate method, the generating step generates a compilation value which is an output from execution of at least one rule and the compilation value is used for fuzzy logic control of the process without run-time execution of any rule.

In an exact method, each compilation value is at least one pointer representative of each rule having a non-zero output for the associated zone of values of the state variables. The compilation value is used by executing each rule in a rule base for which a pointer has been output from the compilation memory, defuzzifying rule outputs from the rule executions by using the height method to provide a controller output, and controlling the at last one actuator based upon the controller output. The rule execution step includes calculating the degree of matching of a left hand side of a rule and the state variables.

The more exact version of the system according to the present invention may be described as a fuzzy logic control system having means for receiving sensed input values corresponding to at least two continuously defined state variables of a process which is to be controlled and a compilation memory having a look-up table stored therein at a plurality of memory locations. A rule base has fuzzy logic rules stored therein. Each of the memory locations has one or more pointers, each pointer corresponding to each rule from the rule base which has a non-zero output when the state variables have values corresponding to the address of that memory location. A means generates an address dependent on the sensed input values and reads out at least one pointer from the compilation memory. A means executes rules corresponding to the pointers which are read out. A means defuzzifies outputs of executed rules by using the height method to provide a controller output. A means supplies the controller output to an actuator acting on the process to control the process without run-time execution of any rule having a zero output for the sensed input values. The system further includes means for calculating the degree of matching of a left hand side of the rule and the state variables. The means for receiving receives sensed continuously defined input values. The means for executing executes all rules having a non-zero output for given values of the state variables. The means for generating generates the address by determining which of a plurality of partitions of state space the current values of the state variables are located in and selecting an address corresponding to that partition.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 2 is a graphical depiction of two fuzzy production rules as discussed above in the background;

FIG. 5 shows an example of matching a fuzzy input vector with two fuzzy production rules;

FIG. 8A shows a rule table of a fuzzy rule set;

FIG. 8B shows the input space and rules of the fuzzy rule set of 8A;

FIG. 9 shows an example of termset for throttle;

FIG. 10 shows a mapping from a dominant rule to a crisp output;

FIG. 11A shows an example of termsets for temperature;

FIG. 11B shows an example of termsets for pressure;

DETAILED DESCRIPTION

Figure 3:
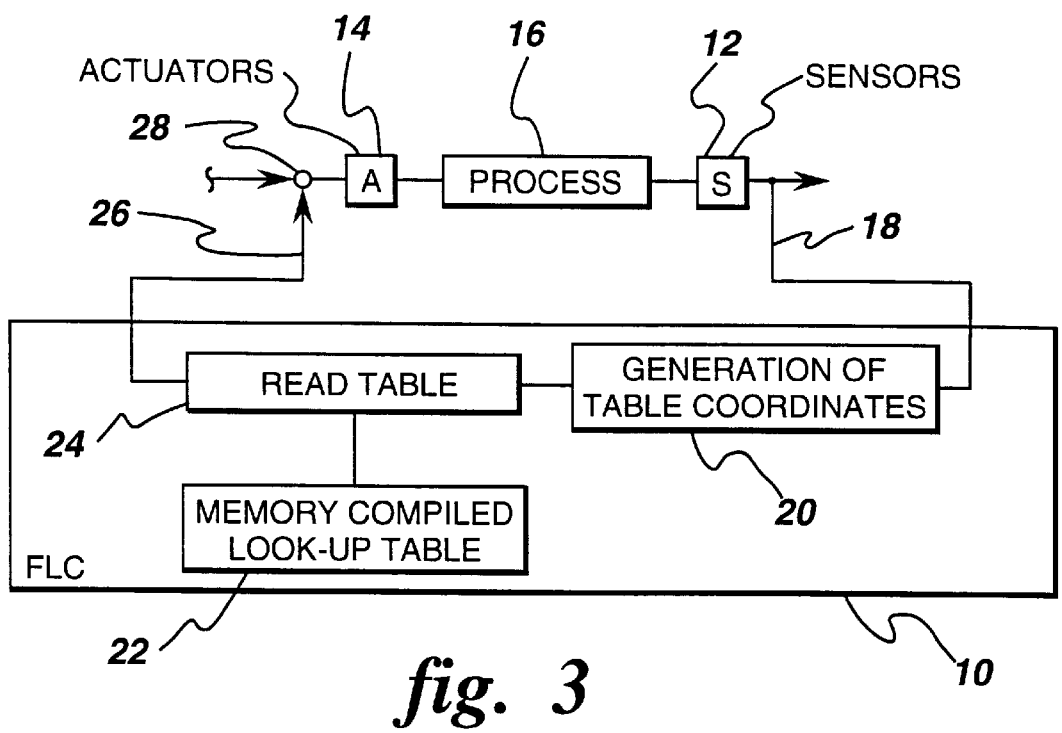
FIG. 3 shows a simplified diagram of a compiled fuzzy logic controller according to the present invention connected to a process.

Turning now to FIG. 3, a fuzzy logic controller 10 is part of a fuzzy logic control system also including sensors 12 and actuators 14. The actuators 14 act upon a process 16 and the sensors 12 sense state variables of the process 16. The process 16 might be a chemical process, or might involve the operation of mechanism or system such as an auto focus camera, a subway train, crane, automobile sub-system, domestic appliance, or any of numerous other types of processes.

Figure 1A:
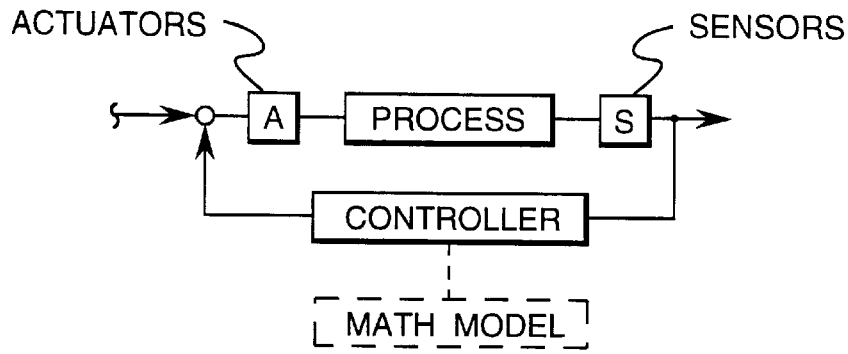
FIG. 1A shows a prior art traditional controller as discussed above.
Figure 1B:
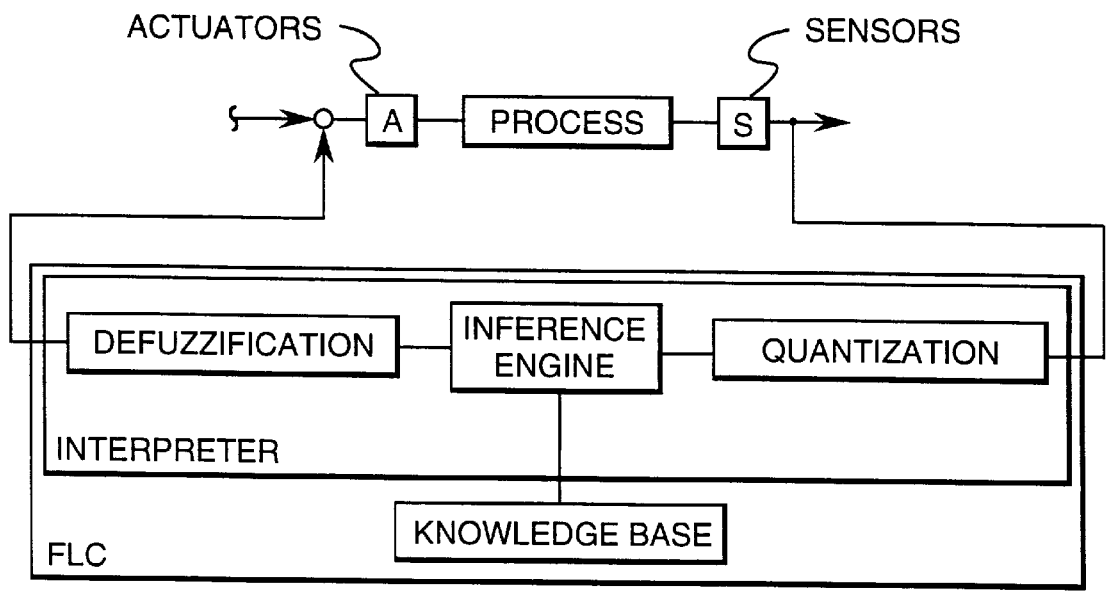
FIG. 1B shows a prior art interpreted fuzzy logic controller as discussed above.

The compiled fuzzy logic controller 10 according to the present invention receives values for the state variables on lines 18 (depicted as a single line for ease of illustration). The signals or values on lines 18 are supplied to box 20 which generates table coordinates or addresses corresponding to memory locations within memory 22. The memory 22 has values from the execution of rules within a fuzzy logic rule base or knowledge base like that shown in FIG. 1B. The address or table coordinates generated by block 20 corresponds to a memory location within memory 22 at which the output from rule execution corresponding to the currently senses input conditions is stored.

A simple example may aid in understanding. If the sensed conditions fed to block 20 correspond to a temperature of 5° and a pressure of 10 pounds per square inch, the block 20 will generate an address corresponding to the output from rule execution of the rule or knowledge base when the temperature is 5° and the pressure is 10 pounds per square inch.

The address from block 20 is supplied to block 24 which reads the table by addressing the proper address of the memory 22 and supplies one or more outputs on lines 26. Referring back to the previous example, if the temperature was 5° and the pressure was 10 pounds per square inch, the value or values on lines 26 correspond to actions which should be taken by the actuators 14 (one or more than one actuator might be used) upon sensing a temperature of 5° and a pressure of 10 pounds per square inch. In the diagram of FIG. 3, the outputs on lines 26 may be supplied to a summer 28 which simply shows that other commands or inputs may be supplied to the actuators 14 and/or process 16.

Although logical circuits could be used to provide the blocks 20 and 24 which interact with memory 22, the blocks 20 and 24 may also be realized by a microprocessor (not shown) connected to the memory 22 and programmed to generate the addresses or table coordinates and to read the memory 22 in the described fashion.

Before presenting an explanation of the manner in which an interpreted fuzzy logic controller may be used to establish the memory 22, several characteristics of the fuzzy logic controller 10 should be emphasized. The fuzzy logic controller 10 may operate over a continuously defined state space. In other words, the state values which are provided to block 20 need not have discretization performed on them. Quite significantly, the fuzzy logic controller 10 may operate using knowledge from a fuzzy logic control knowledge or rule base, but without requiring one to execute the rules during the run time. As will be explained in more detail hereafter, the rules will have been executed and compiled in memory 22 such that the relatively large memory and relatively high processing power required for an interpretive fuzzy logic controller will not be needed with the arrangement of FIG. 3.

Fuzzy-Rule Set Interpreter

In the background, fuzzy rule set R was defined as composed of m fuzzy production rules $r_i$. The interpretive process will now be explained.

Assume an input vector I composed of n input elements:

$$I=[I_1,I_2,\ldots,I_n] \quad (5)$$

Each input element $I_j$, $j=1,\ldots n$ takes as values a fuzzy set $\mu I_j(x_j)$ defined on the universe of discourse $X_j$ of each state variable:

$$I=[\mu_{I_1}(X_1),\mu_{I_2}(X_2),\ldots,\mu_{I_n}(X_n)] \quad (6)$$

Note that if an input element $I_j$ has a crisp value, say $x_0$, its value will be represented by a membership function $$\mu_{I_j}(X_j) = \begin{cases} 1 & \text{if } X_j = X_0 \\ 0 & \text{otherwise} \end{cases} \quad (7)$$

The above process correspond to the quantization phase of the FLC.

Let us briefly define the steps in the inference engine of the interpreter. We need to define the evaluation of each predicate in the left hand side (LHS) of each rule, the overall LHS evaluation for each rule, the output (conclusion detachment) of each rule, and the aggregation of all the rules outputs.

The following design choices (assumptions) A1 et seq. are made:

A1: Each fuzzy rule is represented by the cartesian product operator. Recalling equation 4:

$$r_i = \mu_{X_{i,1}}(X_1) \times \mu_{X_{1,2}}(X_2) \times \ldots \times \mu_{X_{i,n}}(X_n) \times \mu_{Y_i}(y) \quad (8)$$

Figure 4:
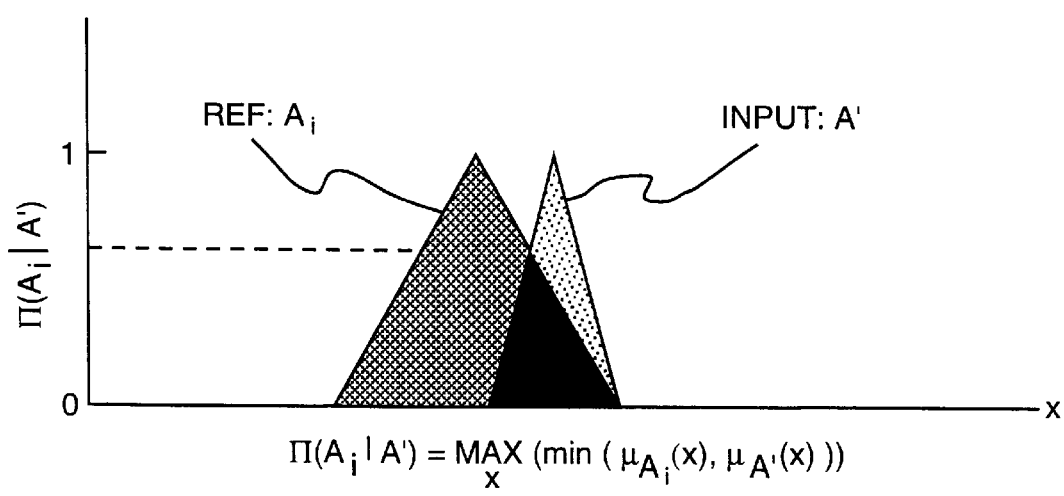
FIG. 4 shows an example of possibility measurement evaluation.

A2: The degree of matching between an input vector element $I_j$ and its corresponding state variable $X_{i,j}$ in rule $r_i$ is given by the possibility measure, as illustrated in FIG. 4:

$$\prod (X_{i,j} \mid I_j) = \bigvee_{xj} \left( \min[\mu_{X_{i,j}}(X_j), \mu_{I_j}(X_j)] \right) \quad (9)$$

Note that if the input element $I_j$ has a crisp value, expression 9 can be further reduced. By substituting equation 7 in 9, we can observe that the value of expression 9 will be zero for all $x_j \neq x_0$. Therefore, for this special case:

$$i\,\Pi(X_{i,j}|I_j)=\min[\mu_{X_{i,j}}(X_0),\mu_{I_j}(X_0)]=\mu_{X_{i,j}}(X_0) \quad (10)$$

Thus, when the input is crisp, the above degree of matching is given by the evaluation of the characteristic function (reference membership distribution) at the point representing the value of the input.

A3: The Left Hand Side (LHS) evaluation of each rule $r_i$ is implemented with the minimum operator to calculate the degree of matching.

$$\lambda_i = \bigwedge_j \prod (X_{i,j} \mid I_j) \quad (11)$$

A4: The conclusion detachment $Y'_i$ is obtained from rule $r_i$ using the minimum operator:

$$\mu_{Y_i}(y)=\min[\lambda_i,\mu_{Y_i}(Y)] \quad (12)$$

The above expression requires calculating the minimum between a constant ($\lambda_i$) and a distribution ($\mu_{Y_i}(Y)$). The expression is just a shorthand notation for the equivalent (but dimensionally comparable) expression:

$$\mu_{Y_i}(y)=\min[\mu_{\lambda_i}(y),\mu_{Y_i}(y)] \quad (13)$$

where $\mu_{\lambda_i}(y)$ is a membership function with value $\lambda_i$ for all y in Y.

FIG. 5 illustrates the matching between the two rules of FIG. 3 and the input vector, illustrated at the bottom of FIG. 5. In this figure we can observe the possibility measures of each state variable with its correspondent input element (denoted by the maximum of the black overlapping), the $\lambda$ of each rule (denoted by the thermometer icon labeled degree of rule applicability), and the conclusion detachment (output) of each rule (denoted by the truncated distribution appearing in the action column).

Figure 6:
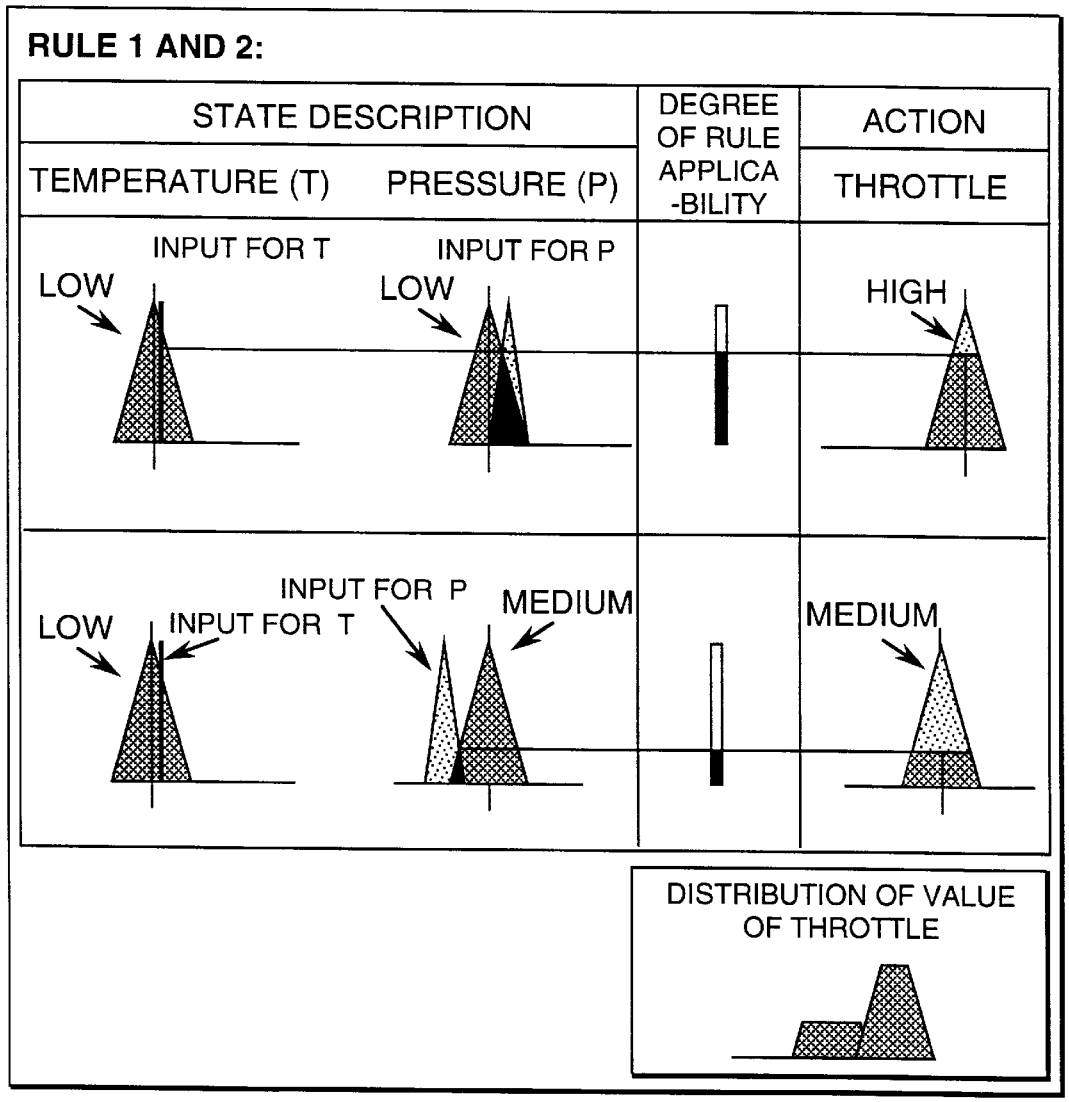
FIG. 6 shows an example of aggregation of rule outputs.

A5: The rules aggregation is performed using the maximum operator. FIG. 6 illustrates the aggregation of the output of all rules, after the matching process.

$$\mu_Y(y) = \bigvee_i \mu_{Y_i}(y)$$

Figure 7:
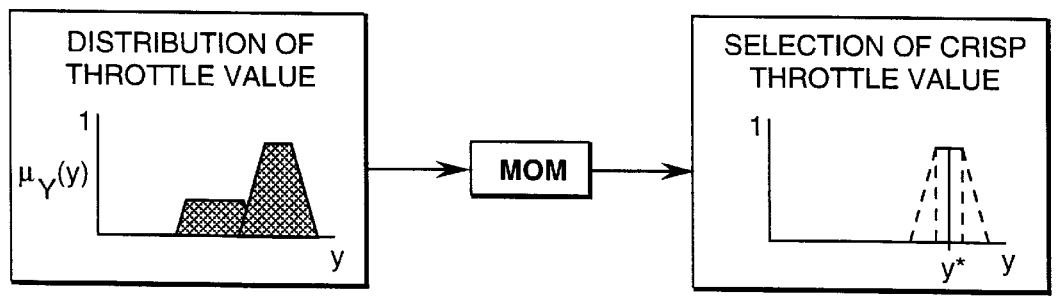
FIG. 7 shows an example of the Mean of Maxima (MOM) defuzzification method.

A6: The defuzzification function is the Mean of Maxima (MOM). The output of MOM is defined as the point y* in the base variable y, in which the membership distribution $\mu_Y(y)$ achieves its maximum. If the maximum is obtained in multiple points, y* is the average of such set of points. Therefore we can define the interval of points $\overline{y}^*$ (underline top) where such maximum is achieved, $$\overline{y}^* = \left\{ \hat{y}\varepsilon\gamma \mid \mu_Y(\hat{y}) = \bigvee_y \mu_Y(y) \right\} \quad (15)$$

and then define y* as the average of $\overline{y}^*$. The MOM defuzzification process is illustrated in FIG. 7.

To summarize this inference process, we can substitute equation 12 in 14 and observe that the output of the FLC is described as:

$$\mu_Y(y) = \bigvee_i (\min[\lambda_i, \mu_{Y_i}(y)]) \quad (16)$$

where the symbol $\vee$ indicates the supremum operation and the coefficients $\lambda_i$ determine the degree of applicability of rule $r_i$. Recalling the definition of $\lambda_i$ from equation 11:

$$\lambda_i = \bigwedge_j \prod (X_{i,j} \mid I_j) \quad (17)$$

where the symbol $\wedge$ indicates the minimum operator.

The value $\Pi(X_{i,j}|I_j)$ is the possibility measure between the reference value $X_{ij}$ and the input $I_j$. This measure represents the partial degree of matching between the value of each of the state variable in rule $r_i$ and its corresponding input value. Recalling the definition of the possibility measure from equation 9:

$$\prod (X_{i,j} \mid I_j) = \bigvee_{X_j} \left( \min[\mu_{X_{i,j}}(X_j), \mu_I(X_j)] \right). \quad (18)$$

Equations 16, 17, and 18 describe the generalized modus ponens, which is the basis for the interpreter of a fuzzy-rule set, under assumptions A1–A5 described above. Finally, using assumption A6, we can summarize the output distribution $\mu_y(y)$ through the defuzzification process called Mean of Maxima (MOM).

Fuzzy-Rule Set Compiler

The compiler's task is to generate a look-up table in which to store the mapping from any arbitrary input (i.e., any arbitrary input vector into a specific action, i.e. $\bar{I} \rightarrow Y$.

The compilation process will be described in stages starting from the output and tracing the process back to the input. First, it will be proved that the crisp output y* is a function of the dominant rule $r_i^*$ only. Then how to obtain the crisp output will be determined; given a dominant rule. Next the regions of the input space in which a rule is dominant will be identified. Finally it will be shown how to generate a table of crisp outputs, how to address it and compute the storage requirements and addressing overhead. It will also be shown how the compilation process can be modified to reflect the use of a different defuzzification method, the Height Method (HM). This modification is motivated by the better performance that the Height Method provides relative to the MOM.

Proof That the Crisp Output y* is a Function of the Dominant Rule $r_i^*$

This section will prove that under assumption A1–A5, and the MOM defuzzification method (A), the output of the FLC will depend only the dominant rule.

By substituting equation 16 in 15, we have:

$$\bar{y}^* \left\{ \hat{y} \varepsilon \gamma \mid \mu_Y(\hat{y}) = \bigvee_y \bigvee_i (\min[\lambda_i, \mu_{Y_i}(y)]) \right\} \quad (19)$$

Let us make an additional assumption (A7), namely that for all i, $\gamma_{Yi}(y)$ is normal (i.e., there is at least one element y'$\epsilon$Y for which $\mu_{Yi}(y')=1$:

$$\bigvee_y \mu_{Y_i}(y) = 1 \text{ for each } i \quad (20)$$

Then, the expression $$\bigvee_y \bigvee_i (\min[\lambda_i, \mu_{Y_i}(y)])$$

in equation 19 achieves it supremum for the value of i=i*, such that $$\lambda_i^* = \bigvee_i \lambda_i \quad (21)$$

By recalling equation 11 and substituting in 21:

$$\lambda_i^* = \bigvee_i \bigwedge_j \prod (X_{i,j} \mid I_j) \quad (22)$$

Therefore, $\lambda_i^*$ indicates the highest degree of matching between a reference state vector $\bar{X}_i^*$ and the input vector $\bar{I}$.

The rule $r_i^*:\bar{X}_i \rightarrow Y_i$ is referred to as the dominant rule. (If two or more rules are dominant, e.g., rule $r_i$ and $r_k$, only occurring when the rules have equal degrees of matching, one of the two rules can be selected as the dominant one for this iteration.)

Equation 19 is rewritten as:

$$\bar{y}^* = \{ \bigodot \epsilon \gamma \mid \mu_{Y_i^*}(\bigodot) = \lambda_{i^*} \} \quad (23)$$

Making an additional assumption (A8), namely that the value $\mu_{Y_i}(y)$ of each output $Y_i$ is a convex fuzzy set, at any iteration, the output $\mu Y_{i^*}(y)$ of the dominant rule $r_i^*$ will also be convex. A fuzzy set A is convex if:

$$\mu_A(w \times u_1 + (1-w) \times u_2) \geq \min(\mu_A(u_1), \mu_A(u_2))$$

Therefore, the interval described in equation 23 will always be continuous, i.e. $y^* = [y_{min}, y_{max}]$, where $$y_{max} = \max (\bigodot \epsilon \bar{y}^*)$$

and $$y_{min} = \min(\bigodot \epsilon \bar{y}^*)$$

The average point y* can then be easily computed as:

$$y^* = (y_{max} + y_{min})/2 \quad (24)$$

Finally, an additional assumption (A9) is made that all fuzzy sets $\mu_{Yi}(y)$ are symmetric with respect to their maximum value. With this assumption we can prove that, provided that rule $r_i^*$ is still the dominant rule, changes in the value of $\lambda_{i^*}$ will not modify the final value of y*.

It is easy to show that if the degree of matching of the dominant rule is $(\lambda_{i^*} \pm \epsilon)$, the interval $\bar{y}^*$ is $$\bar{y}^* = \{ \hat{y} \epsilon \gamma \mid \mu_{Y_{i^*}}(y) = (\lambda_{i^*} \pm \epsilon) \} \quad (25)$$

Because of the symmetry of $\mu_{Y_{i^*}}(y)$, the interval $\bar{y}^*$ will be symmetrically modified, i.e., $\bar{y}^* = [y_{min} \pm \delta, y_{max} \pm \delta]$, where $\delta$ is a function of $\epsilon$ and $\mu_{Y_{i^*}}(y)$. Therefore, its average point y* will be constant.

Equations 23 and 25 complete the proof that the output depends only on the dominant rule.

Extracting the Crisp Output Given the Dominant Rule

This result enables us to pre-compile the result y* for each dominant rule $r_i^*$, without requiring the computation of the matching coefficient $\lambda_{i^*}$.

For example, let us consider the rule table in FIG. 8A. It contains nine rules mapping state vectors into actions:

[Temperature,Pressure]→Throttle

The termset illustrated in FIG. 9 is used to define the values of the output Throttle. By looking at the rule table described in FIG. 8 we can identify the output of each rule $r_i$. By looking at the termset for the output described in FIG. 9 we can identify the value of the abscissa $u_{i^*}$ in which each output $\mu_{Yi}(y)$ achieves its maximum. For this example the mapping from dominant rules to crisp output is illustrated in FIG. 10.

All we need to store for the compilation process is a one-dimensional array containing the values of the last column of the table in FIG. 10.

Determination of the Dominant Rule $r_i^*$

The last step in the rule base compilation is the identification of the dominant rule at each iteration as a function of the input. This identification can be accomplished by observing the termset definition for the state variables and the output variables. For example, let us use the termset defined by FIGS. 11A and 11B to define values for the state variables Temperature and Pressure.

First, we define the input space as the cartesian product of the universe of discourse of the two state variables. In general the input space is defined by the cartesian product $X_1 \times X_2 \ldots \times X_n$, where $X_j$ is the universe of discourse of the jth input element and the jth state variable.

Figure 13:
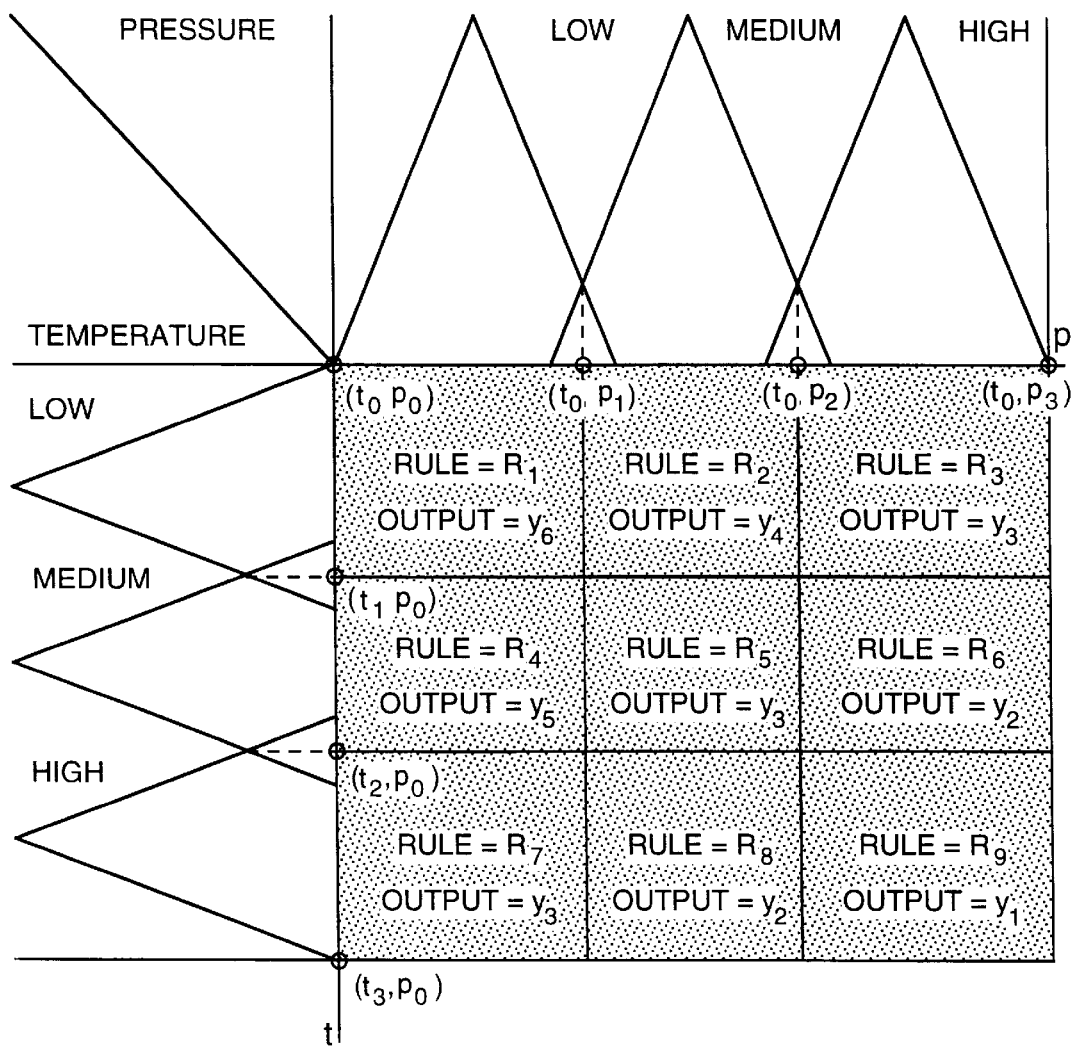
FIG. 13 shows an example of rule set compilation using Mean of Maxima (MOM)

Next we partition this space as illustrated in FIG. 13. Along each axis, the boundaries of the partitions are defined by the points (of the corresponding universe of discourse) in which two membership distributions intersect. Therefore the number of partitions corresponds to the product of the cardinality of the termset of each state variable. More formally, if the universe of discourse $X_j$ has a termset with $t_j$ terms, and if we have n state variables in the state vector, then the maximum number of partitions p will be:

$$p = \prod_{j=1}^{n} t_j \tag{26}$$

If all termsets have the same cardinality $t_j=t \forall j$, this expression reduces to:

$$p=t^n \tag{27}$$

Note that this expression is also the upper bound for the number of rules in the rule base, i.e., m.

Therefore, given the termset corresponding to the values of each state variable, we can determine the boundaries of the partition by finding the points of the universe of discourse in which two terms (in the termset) intersect. In FIG. 13, these points are denoted as $(t_0,p_0)$, $(t_1,p_0)$, etc.

We will now prove the above statement, i.e., that the boundaries are defined by the points of intersection of adjacent membership distributions in the same termset.

Derivation of the Partitions' Boundaries

Figure 12:
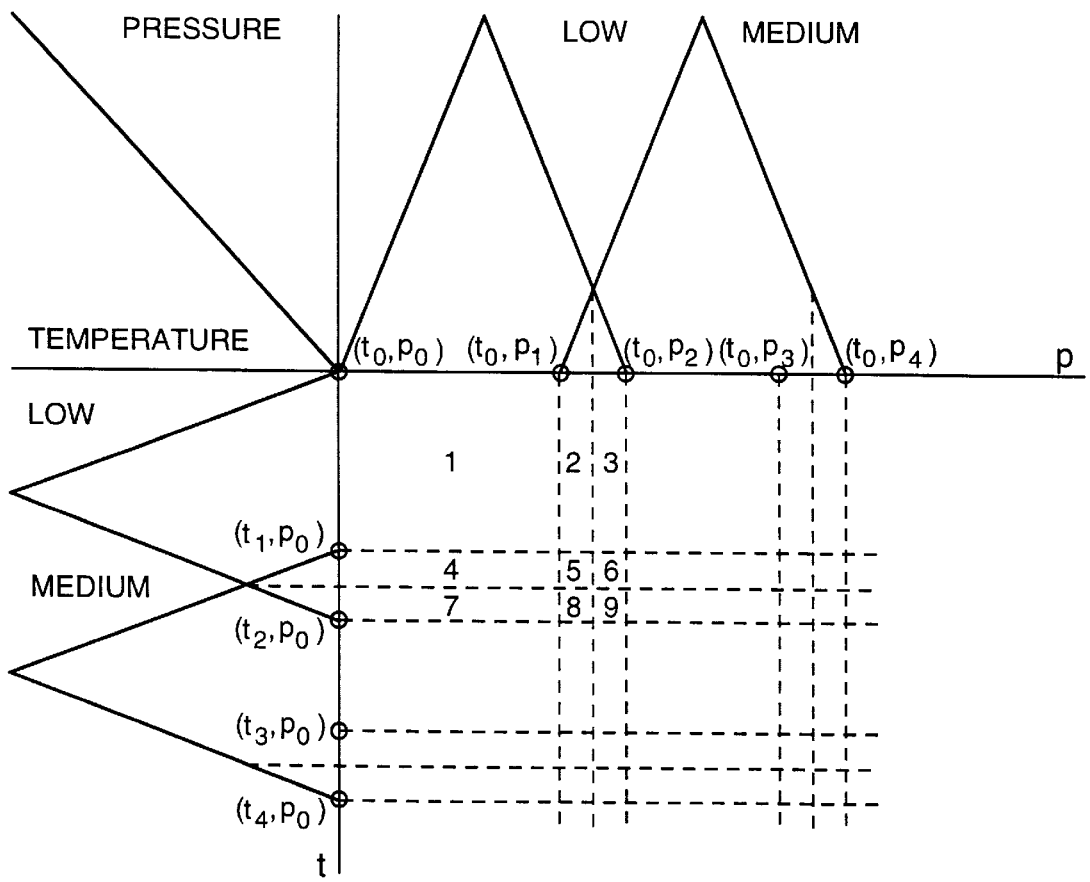
FIG. 12 shows a graphical breakdown of the state space.

Let us examine a subset of the rules shown in FIG. 13, namely: R1, R2, R4, and R5. We will analyze these rules in the input space as illustrated in FIG. 12. In such figure we have identified nine regions. The goal of our analysis is to prove that subsets of these regions can be grouped together was they share a common dominate rule.

Case Analysis: Region 1

Let us assume any arbitrary input, represented as the point (t', p') in the input space. If the point is in region 1, by using equation 11 we can easily verify that:

$$\lambda_1 = \min[\Pi(LOW|t'), \Pi(LOW|p')] \tag{28}$$

Using equation 10 in 28:

$$\lambda_1 = \min[\mu_{LOW}(t'), \mu_{LOW}(p')] \neq 0 \tag{29}$$

From the same FIG. 12, we can also see that the membership distribution of all the other terms in the termsets are zero when evaluated in the point (t', p'). Therefore all other rule outputs are zero, i.e.,: $\lambda_i = 0$ for $i \neq 1$.

Since rule R1 has the only non-zero output, R1 is also the dominant rule.

Case Analysis: Region 2

Given any arbitrary point (t', p') inside Region 2, by a similar analysis we can observe that there are only two rules with non-zero output: R1 and R2. Their coefficient of applicability or matching are:

$$\lambda_1 = \min[\mu_{LOW}(t'), \mu_{LOW}(p')] \neq 0 \tag{30}$$

and $$\lambda_1 = \min[\mu_{LOW}(t'), \mu_{MEDIUM}(p')] \neq 0 \tag{31}$$

From FIG. 12 we can observe that, by construction, for any points in region 2:

$$\mu_{LOW}(p') \geq \mu_{MEDIUM}(p') \tag{32}$$

Therefore, using inequality 32 in equation 30 and 31 we can prove that $$\lambda_1 \geq \lambda_2 \tag{33}$$

Therefore rule R1 is the dominant rule when the inequality of expression 33 holds. In the case of equality, we can still assume that R1 is dominant (by convention).

Case Analysis: Region 3

By symmetry, using an analogous analysis, we can prove that $\lambda_2 \geq \lambda_1$, and therefore R2 is the dominant rule.

Case Analysis: Region 4

An analysis similar to the one performed for region 2 leads to the conclusions that there are only two non-zero rules in this region: R1, and R4. Furthermore, we can prove that R1 is dominant, since $\lambda_1 \geq \lambda_4$.

Case Analysis: Region 5

Any arbitrary point in this region will-cause a partial matching in the LHS of four rules: R1, R2, R4, and R5.

The corresponding matching coefficients are, respectively:

$$\lambda_1 = \min[\mu_{LOW}(t'), \mu_{LOW}(p')] \neq 0 \tag{34}$$

$$\lambda_2 = \min[\mu_{LOW}(t'), \mu_{MEDIUM}(p')] \neq 0 \tag{35}$$

$$\lambda_4 = \min[\mu_{MEDIUM}(t'), \mu_{LOW}(p')] \neq 0 \tag{36}$$

$$\lambda_5 = \min[\mu_{MEDIUM}(t'), \mu_{MEDIUM}(p')] \neq 0 \tag{37}$$

By construction of Region 5 we also know that:

$$\mu_{LOW}(p') \geq \mu_{MEDIUM}(p') \tag{38}$$

and $$\mu_{LOW}(t') \geq \mu_{MEDIUM}(t') \tag{39}$$

From the above inequality we can derive a partial order over the matching coefficients:

$$\lambda_1 \geq \{\lambda_2, \lambda_4\} \geq \lambda_5 \tag{40}$$

Therefore, since no other rule has a higher coefficient than R1, we can still consider R1 to be the dominant rule.

Case Analysis: Regions 6–9

By symmetry, a similar analysis for the remaining regions will lead to the conclusions that: rule R2 is dominant in region 6; rule R4 is dominant in regions 7 and 8; and rule R5 is dominant in region 9.

We can easily extend this case analysis to cover the larger rule set of FIG. 13. Such analysis would verify that indeed the partitions boundaries can be found at the points where the membership distributions intersect.

Example of the Compilation Process Using MOM

The dominant rule in each partition is the one whose Left Hand Side correspond to the label attached to the partitions. See, for example FIG. 8 and FIG. 13.

We can then classify any arbitrary input against these boundaries, to determine the region to which the input belongs. Given that a dominant rule has been associated to that region, all we need to do is read the crisp output associated with the dominant rule. This can be done by using the table generated in the first stage. See for example the table illustrated in FIG. 10.

This procedure clearly extends to more than two state variables (input elements). The only difference for higher dimensionally is the larger size of the table.

To summarize, the result of the compilation process of this rule table, according to assumptions A1–A9, is illustrated in FIG. 13.

Change to the Partitioning of the Input Space If Height Method is Used

Figure 14:
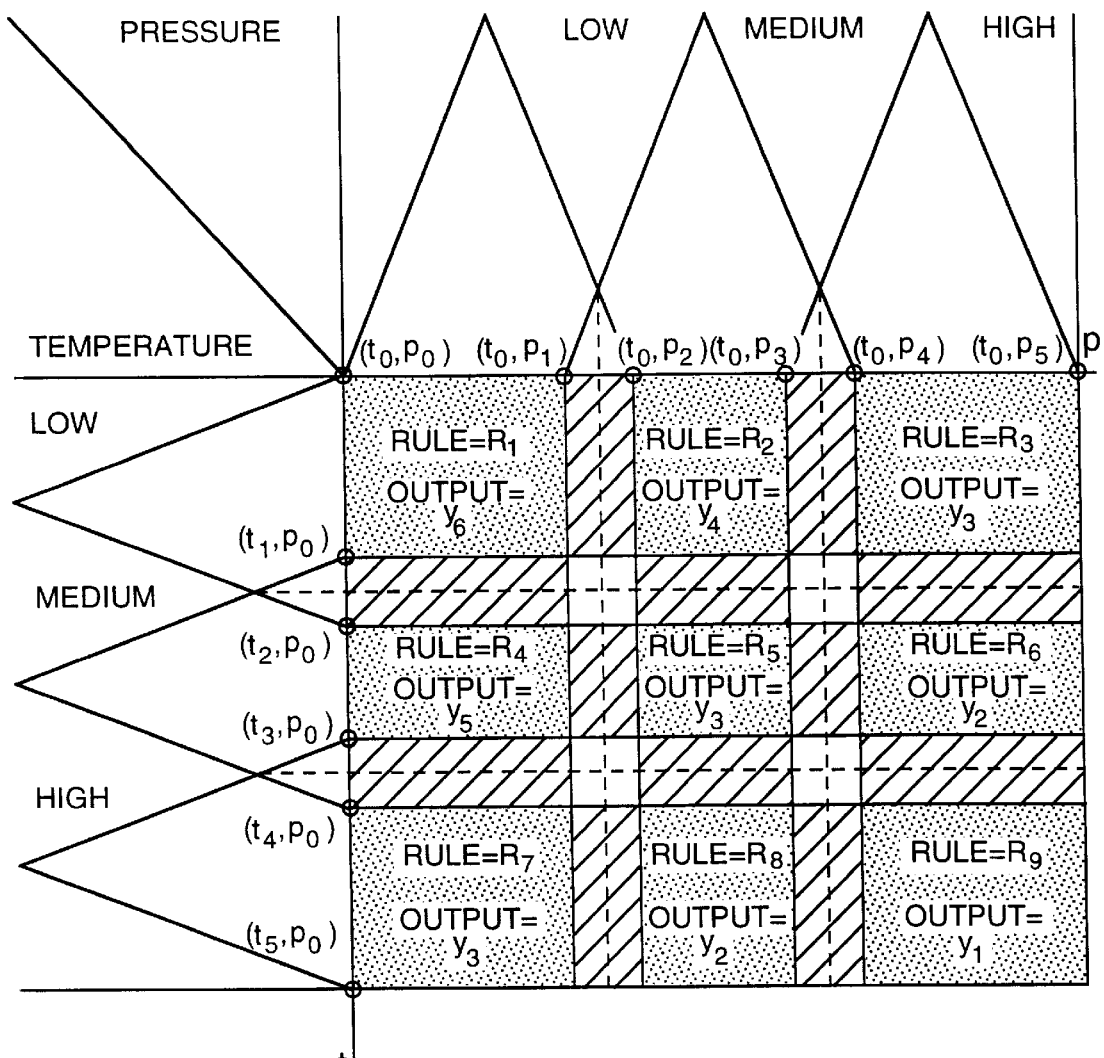
FIG. 14 shows an example of rule set compilation using a height method.

If a different defuzzification method is used, the compilation will be slightly modified. For instance, if we use the Height Method, we obtain a look-up table as illustrated in FIG. 14. The partitions boundaries are now determined by the points in which the membership distribution of each term (in the termset) become zero. In FIG. 14, these points are denoted as $(t_0, p_0)$, $(t_1, p_0)$, etc.

By using the Mean of Maxima (MOM), we noted that the FLC final output was only a function of the output associated to the dominant rule.

Figure 15:
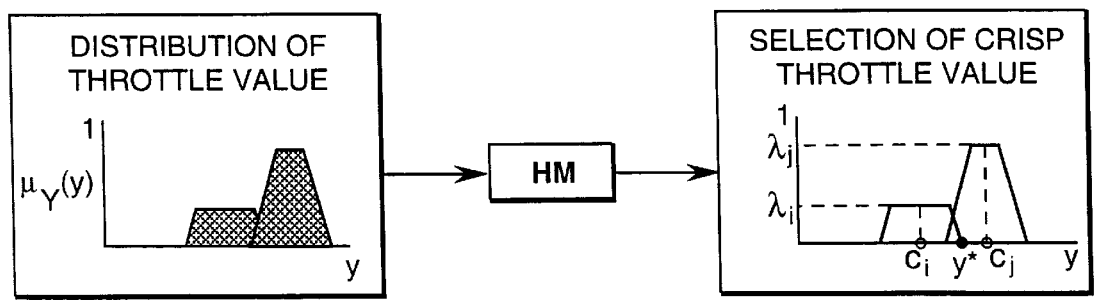
FIG. 15 shows an example of height method defuzzification.

Using the Height Method (HM), we will have to consider all non-zero rule outputs and not just the dominant. The HM method derives the crisp out y* as:

$$y^* = \frac{\sum_i \lambda_i \times c_i}{\sum_i \lambda_i} \quad (41)$$

where $c_i$ is the center of gravity of $\mu_{Yi}(y)$, (the output of rule $r_i$). The HM defuzzification process is illustrated in FIG. 15.

In the case of our example, because of the symmetry of our distributions, the center of gravity of each rule is identical to the point where the distribution reaches its maximum. Therefore the table illustrated in FIG. 10 can be used to provide the first moment of each distribution.

FIG. 14 shows three types of regions, represented by three different notations.

There are nine partitions, covered with gray, that represent the regions of the input space that contain only one rule. If there is only one non-zero $_i$ in equation 41, the result is obviously $c_i$. Thus, the crisp output to be stored in those regions can be obtained from the table in FIG. 10.

The twelve partitions covered with black stripes represent the regions of the input space that contain two non-zero rule outputs. For example, the striped region in FIG. 14 located between the regions dominated by rules R1 and R4, contains two non-zero rules, namely R1 and R4.

The function which should be evaluated to obtain the crisp output is $$y^* = \frac{(\lambda_1 \times c_1) + (\lambda_4 \times c_4)}{(\lambda_1 + \lambda_4)} \quad (42)$$

The value of $\lambda_1$ and $\lambda_4$ must be evaluated at run time. While this is a considerable saving with respect to the evaluation of all the rules, it is not as convenient as avoiding the rule evaluation completely. A reasonable approximation is to replace the evaluation of this function by an average of its values in the region. For example, along the points of the horizontal line drawn through the center of the region, we can see that $\mu_1 = \lambda_4$. Therefore a simple average of the centers of gravity will suffice, i.e. our approximation with be:

$$y^* = \frac{(c_1 + c_4)}{2} \quad (43)$$

Figure 16:
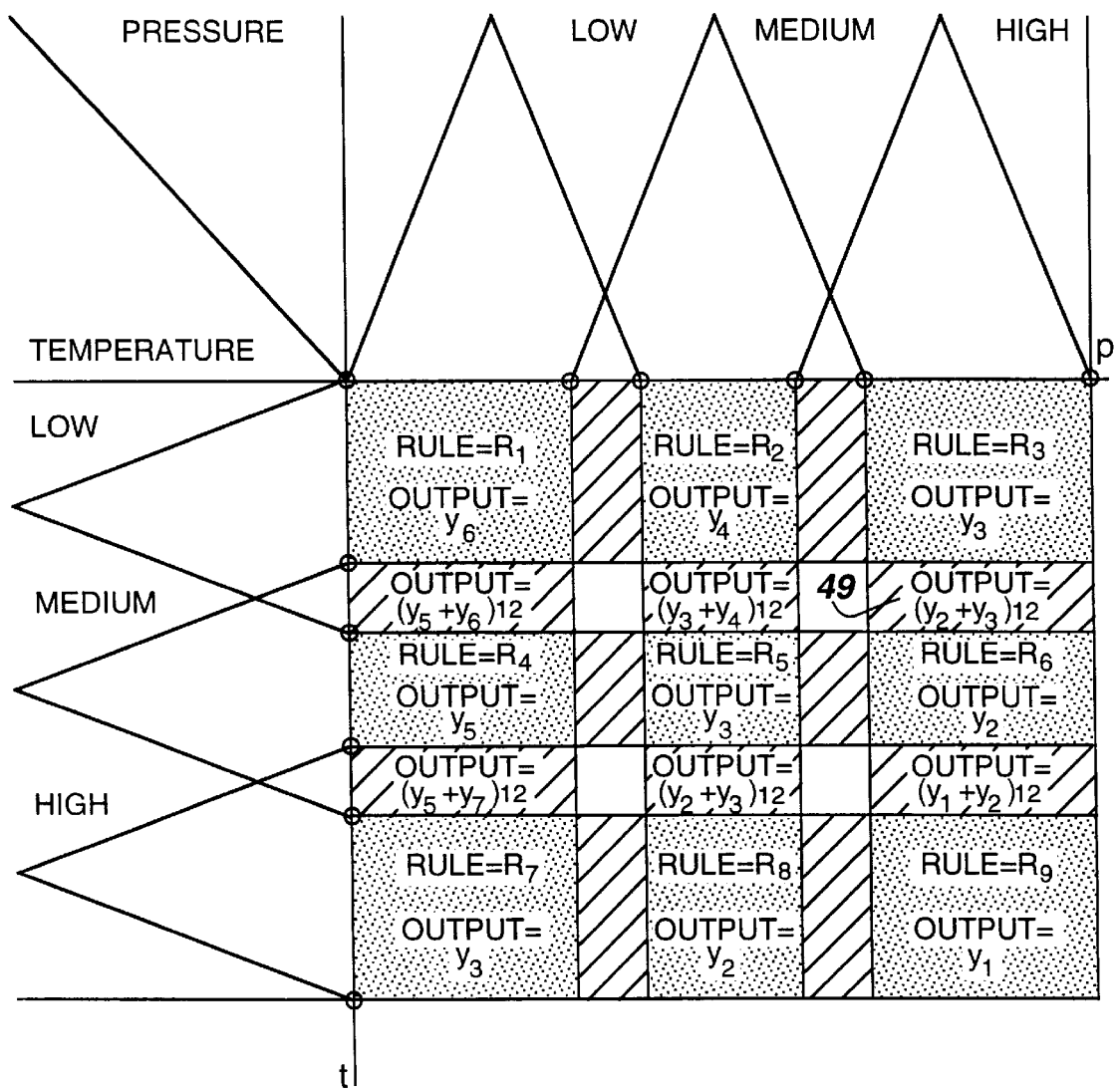
FIG. 16 shows an example of rule set compilation using the height method.

Similarly, we can approximate the value stored in all other striped regions by the average of the center of gravities of the adjacent gray regions. FIG. 16 shows these averages for six of the twelve striped regions.

Finally, there are four partitions, covered with white, that represent the regions of the input space that contain four non-zero rule outputs. By following an analysis similar to the one performed for the striped regions, in each white region we can approximate the function that will compute the crisp output by the average of the four centers of gravity of the neighboring gray regions.

By changing the defuzzification method from the MOM to the HM, we have decreased the granularity of our partition. This change has increased the number of regions and therefore the number of points toe stored (from 9 to 25 in our example). The main advantage resides in the much smoother closed-loop system behavior that HM provides.

In general case, the number of partitions required for HM can be computed as a function of the cardinality of the termset of each state variable.

If the universe of discourse $X_j$ has a termset with $t_j$ terms, and if we have n state variables in the state vector, then the maximum number of partitions p required by the Height Method (HM) will be:

$$p = \prod_{j=1}^{n} (2t_j - 1) \quad (44)$$

If all termsets have the same cardinality $t_j = t \forall j$, this expression reduces to:

$$p = (2t-1)^n \quad (45)$$

Overhead for Generating the Coordinates

The overhead for generating the table coordinates from the input is also minimal. In the worst case, its consists of a number of comparison NC against the boundaries of each region, which is linear in the number of regions.

Mean of Maxima (MOM) For the MOM defuzzification we have:

$$NC = \sum_{j=1}^{n} (t_j) \quad (46)$$

which, in the case of equal termset cardinalities $t_j = t$ for each $\forall j$) reduces to:

$$NC = n \times t \quad (47)$$

If a binary search (instead of a linear search) is used to guide the comparison, the maximum number will be further reduced to:

$$NC = \sum_{j=1}^{n} (\lceil \ln t_j \rceil) \quad (48)$$

and for case of equal cardinality termsets:

$$NC = n \times [\ln t] \quad (49)$$

Height Method (HM)

For the HM defuzzification, we have observed that the number of regions has increased. Thus for Hm we have:

$$NC = \sum_{j=1}^{n} (2t_j - 1) \quad (50)$$

which, in the case of equal termset cardinalities $(t_j = t \forall j)$ reduces to:

$$NC = n \times (2t-1) \quad (51)$$

Using a binary search (instead of a linear search) the maximum number will be further reduced to:

$$NC = \sum_{j=1}^{n} \lceil \ln(2t_j - 1) \rceil \quad (52)$$

and for case of equal cardinality termsets:

$$NC = n \times \lceil \ln(2t-1) \rceil \quad (53)$$

Typical Case

The typical FLC has up to three state variables (i.e., n=3) and the average cardinality of the termset is five (i.e., $t_1=t_2=t_3=5$).

Under these conditions, using equations 27 and 45 the MOM will require storing $5^3=125$ numbers, while the HM will require 729 numbers.

Under the same conditions, according to equations 49 and 53, the generation of table coordinates from the input (using the binary search) will require $3 \times \lceil \ln 5 \rceil = 6$ comparisons for the MOM and $3 \times \lceil \ln(10-1) \rceil = 9$ comparisons for the HM.

Steps to Establish Look-up Table

Figure 17:
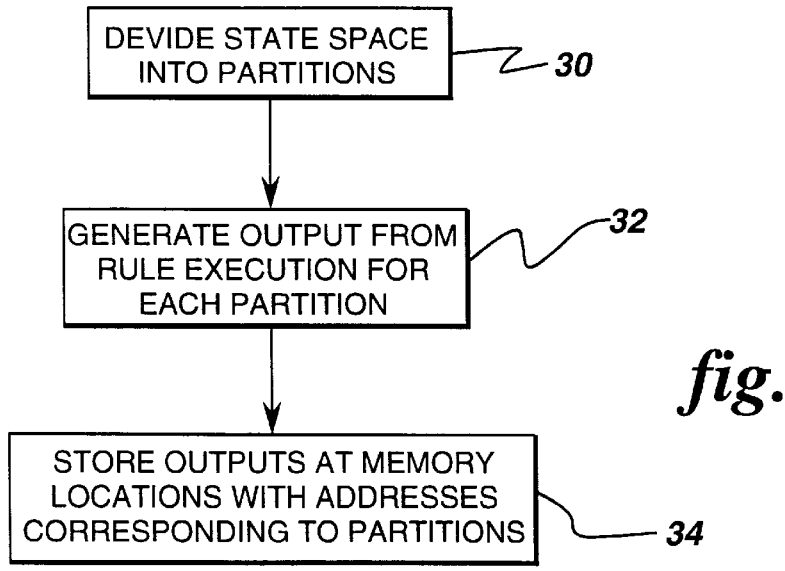
FIG. 17 is a simplified flow chart of the method to establish the look-up table used with the present invention.

With reference now to the flow chart of FIG. 17, a summary of the steps which are used to establish the look-up table within memory 22 of FIG. 3 will be presented. At block 30, the state space is divided into partitions. Referring back momentarily to FIG. 13, these partitions may be defined as the intersection between the termsets. In other words, the boundary between the low pressures and the medium pressures is at the pressure where the characteristic function of low intersects with the characteristic function of medium. Instead of dividing the state space in the manner shown by FIG. 13 corresponding to MOM, the state space may be divided into partitions in the manner shown in FIG. 14 corresponding to the approximate height method defuzzification. Defining the partitions in the manner of FIG. 13 requires less memory than the manner of FIG. 14, but the partition arrangement of FIG. 14 may provide better performance. Other partitioning arrangements might be used.

Block 30 leads to block 32 corresponding to execution of one or more rules for each partition. If the partitioning was performed in the manner corresponding to FIG. 13, a single rule may be executed for each partition and the output of that rule will correspond to that partition. If the partitioning was performed in the manner of FIG. 14, block 32 would execute a single rule for those partitions which have only one applicable rule. For example, the partition corresponding to the block in the upper left of FIG. 14 only requires execution of rule one in order to generate an output $y_6$. Other partitions of FIG. 14 would require executing more than one rule and taking some values based upon the outputs from the executed rules. For example, and as shown in FIG. 16, the output of partitions corresponding to more than one rule having a non-zero output may be calculated by taking an average of the centers of gravity of each applicable rule output. Regardless of whether the output for a particular partition is the result of executing a single rule or is the result of executing more than one rule, block 32 provides an output corresponding to each partition.

Following block 32, block 34 stores the outputs at memory locations within a memory. Significantly, each memory location corresponds to at least one partition and has an address corresponding to the zone of values of the state variables associated with that partition or partitions. This may best be explained with reference to FIG. 13 and taking the simple example wherein there is one memory location for each partition. There are nine partitions in FIG. 13 and, assuming there is one memory location for each partition, FIG. 13 corresponds to a memory map with the horizontal pressure axis replaced by integers to address the three columns and with the vertical temperature axis replaced by integers used to address the three rows. Each memory location corresponds to one partition and holds the output resulting from execution of the corresponding rule, the rule being the applicable rule for the associated zone of values of the state variables.

Figure 18:
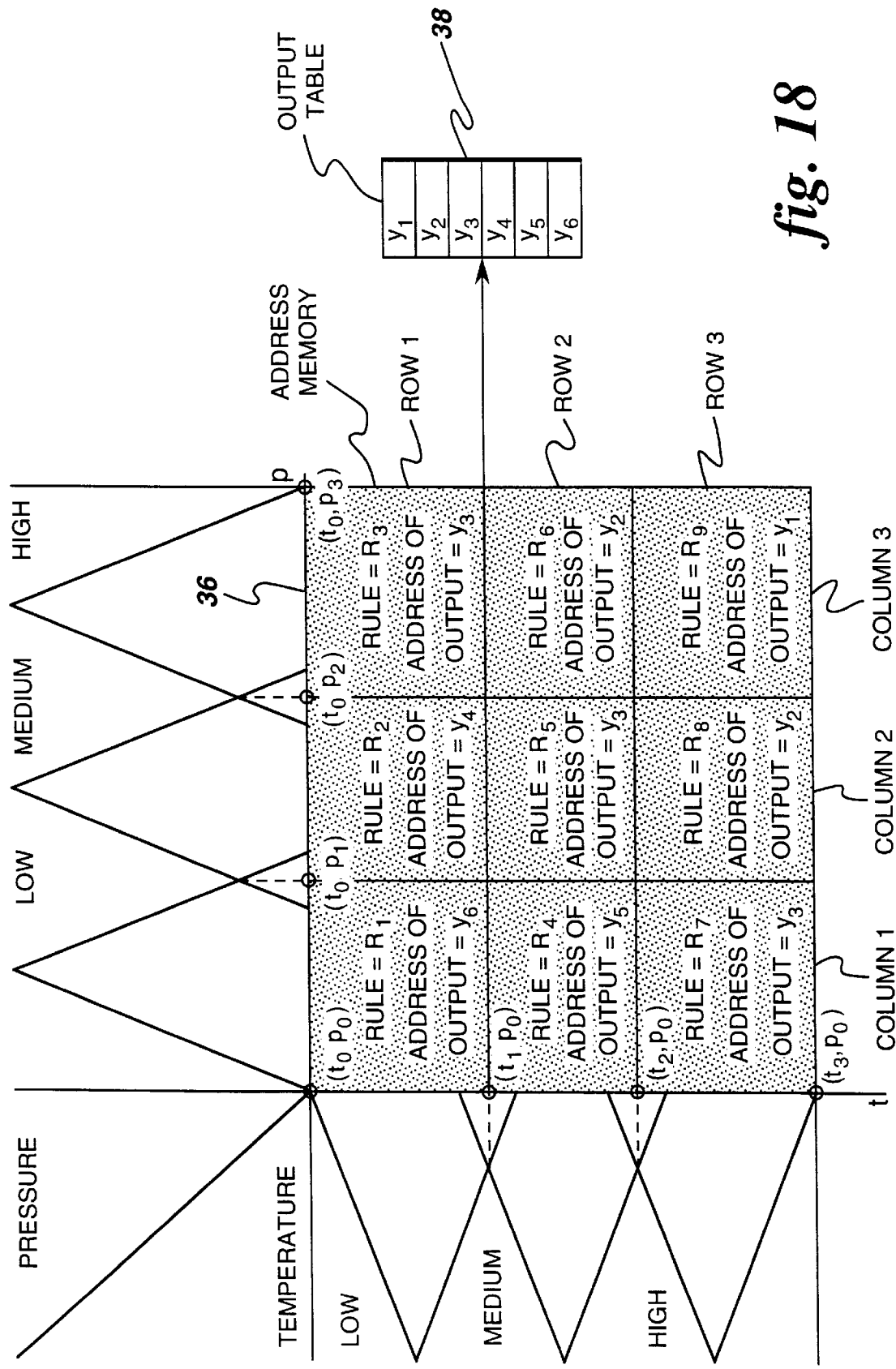
FIG. 18 shows an indirect addressing technique.

The correspondence between the state space partitioning of FIG. 13 and the memory structure is also apparent in FIG. 18 which shows a modified look-up arrangement having an address memory 36 and an output memory 38 (the memories may simply be different locations within a single memory). Referring back momentarily to FIG. 13, one notices that the output value $y_3$ is stored at three different locations. Since storing the same real number at three different locations requires more memory than storing the same address at three different memory locations, indirect addressing may be used with the present invention. Specifically, the address memory 36 may store the address of each output corresponding to a particular partition. The address memory 36 may be used to access the values of the outputs stored in the output table of output memory 38 using known indirect addressing techniques. Although this may increase the number of storage locations over the arrangement of FIG. 13, the storage requirements may be reduced using such a relatively standard indirect addressing since the values stored in address memory 36 are necessarily integers, which require less storage space than real (i.e., non-integer) numbers such as the output values.

Controlling a Process

Having summarized how to set up the look-up table, a summary of the steps used for applying the look-up table to control a process will be presented with reference to FIG. 13. At block 40, sensed input values of state variables are received. Referring also momentarily to FIG. 3, the sensed values may be from the sensors 12.

Following block 40, block 42 decides upon the partition of state space. With reference to FIG. 13, knowledge of the values of the pressure and temperature allow one to readily decide which partition the system is disposed in. The microprocessor (not shown) corresponding to blocks 20 and 24 of FIG. 3 would simply compare the temperature and pressure values and decide which of the partitions correspond to the current values of the state variables.

Block 42 leads to block 44 wherein the address of the memory location corresponding to the appropriate partition is generated. For example, and continuing to refer also to FIG. 13, if the temperature and pressure was such as to correspond to the upper left partition of FIG. 13, the address at which output $y_6$ is stored would be generated, this output corresponding to rule $R_1$.

Following block 44, block 46 uses the address to address and read out the contents of the memory location corresponding to output $y_6$. The memory location which is actually read would of course depend upon the partition which had been selected as corresponding to the current values of the state variables.

After block 46, block 48 supplies the contents of the memory location to one or more actuators such as the actuators 14 of FIG. 3 in order to control the process. In the example given where the output is $y_6$, that output would be supplied to the actuator. Two or more outputs could be used to control two or more actuators.

Figure 19:
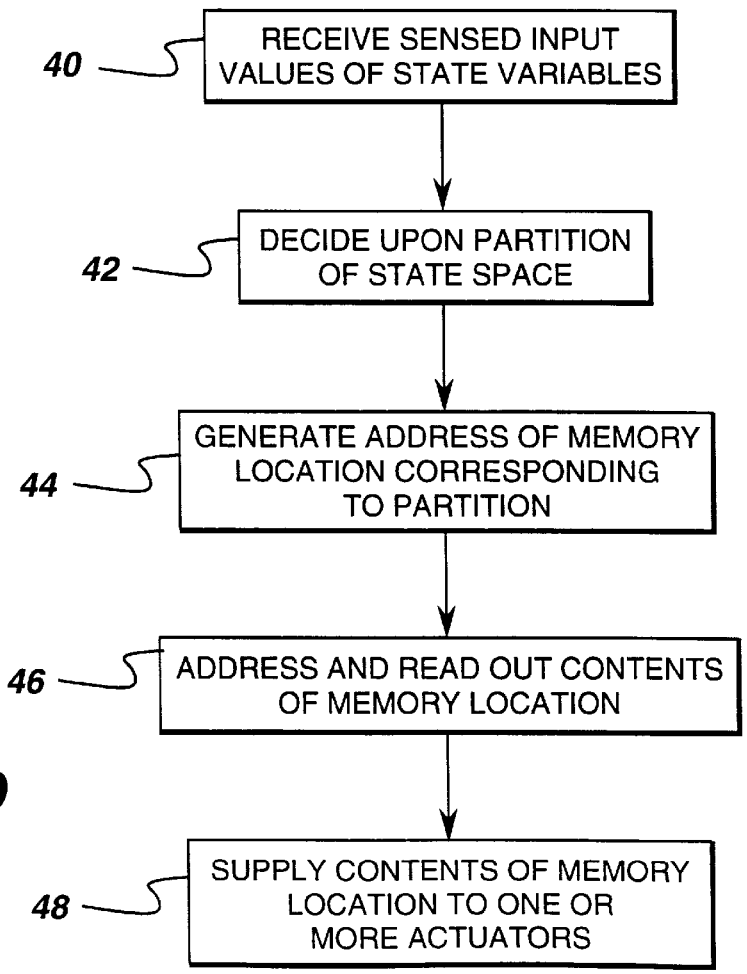
FIG. 19 is a simplified flow chart of the method to use the controller to control a process.

The steps of FIG. 19 could be performed by a computer such as a microprocessor as could the steps of FIG. 17.

Exact Height Method

Recalling that the approximate height method described above with reference to FIG. 16 took a simple average of the centers of gravity for those partitions in which more than one rule was applicable, an approximation of this type advantageously allows one to avoid having to execute rules during run-time. In other words, the fuzzy logic from the rule or knowledge base can be completely compiled and easily accessed using the previously described look-up table arrangement. However, the present invention further contemplates an arrangement shown in FIG. 20 wherein better performance may be achieved with the requirement that at least some rules are executed during run-time. Although run-time evaluation of some rules will be required with the arrangement of FIG. 20, the number of rules can be greatly reduced by this arrangement.

Figure 20:
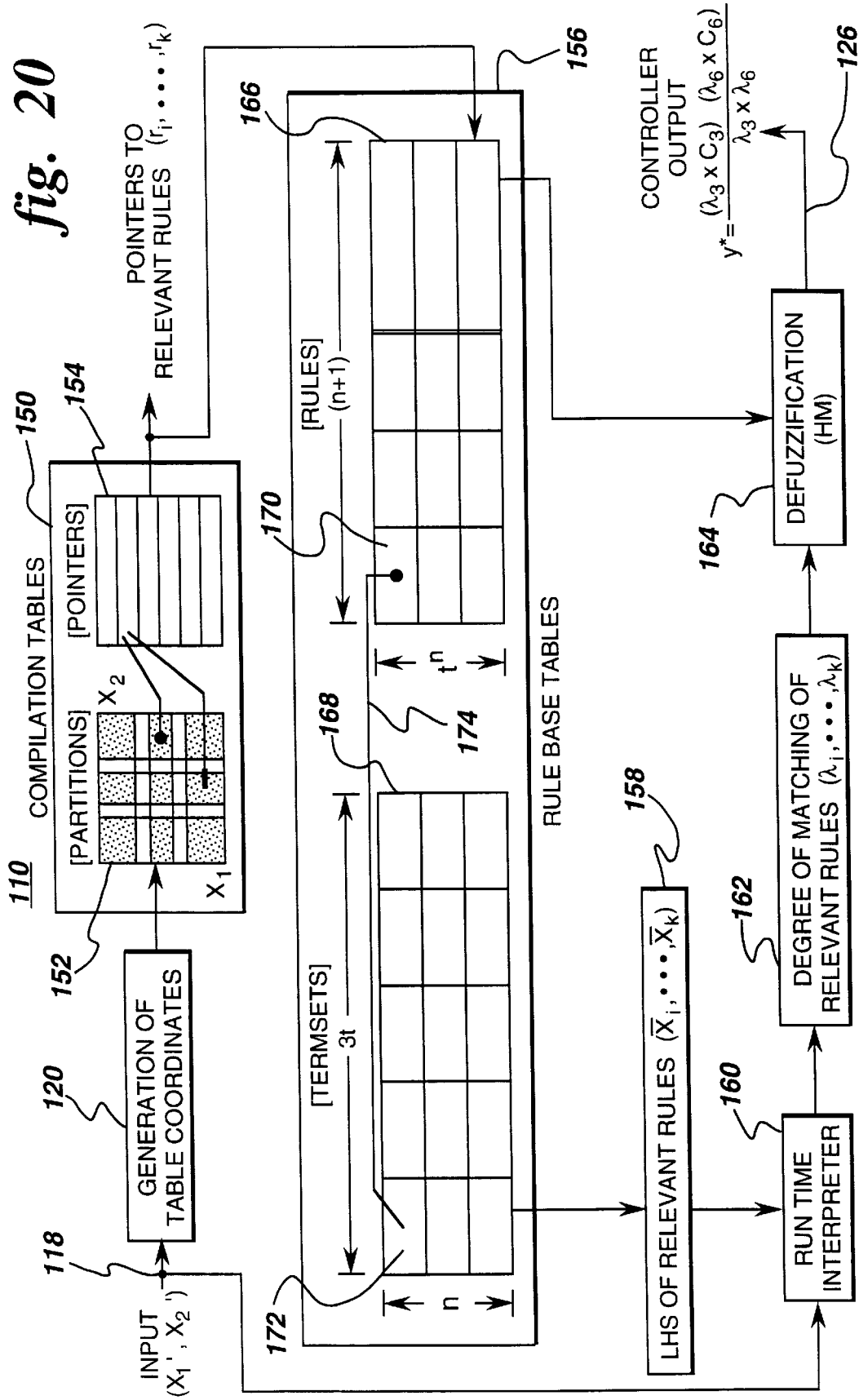
FIG. 20 shows the structure of an exact height method arrangement of the present invention.

The fuzzy logic controller 110 of FIG. 20 receives inputs corresponding to state values on lines 118 and supplies a controller output at line 126. Controller 110 would connect to a process in the manner shown for controller 10 of FIG. 3. The components of FIG. 20 are labeled in the "100" series with the same last two digits as the corresponding component, if any, of the FIG. 3 arrangement. Thus, the block 120 generates the addresses or table coordinates corresponding to a particular partition of state space in much the same manner as discussed above. These addresses are supplied to compilation table memory 150 which includes a partition memory 152 and a pointer memory 154. The memory 150 is shown as using indirect addressing similar to that described above in connection with FIG. 18. However, instead of supplying an output which represents the result from rule execution, the memory 150 instead supplies pointers to indicate the rules which are relevant. In other words, it identifies the rules which have a non-zero value for a partition corresponding to a zone within the state space.

Referring back momentarily to FIG. 16, notice that the partition 49 identifies a zone of state space wherein rule three and rule six are both applicable. In the approximate height method of FIG. 16, the average of the outputs was simply stored for that partition. In contrast, the arrangement of FIG. 20 will execute the two applicable rules upon the state variables falling within that partition of the state space. More specifically, the partition memory 152 will be addressed by block 120 such that it will supply the address of a storage location within pointer memory 154 having pointers to both of the rules.

Continuing with the example where rule 3 and rule 6 are applicable, pointers from pointer memory 154 are supplied to a rule base memory 156. Before discussing the internal structure of rule base 156, it is noted that it will supply the left hand side of the relevant rules (rule three and rule six in the example) to block 158, which block leads to run time interpreter 160, which has also been supplied with the inputs or current values of the state variables. The run time interpreter 160 leads to block 162 which determines the degree of matching of the relevant rules to the current conditions. For example, block 162 will calculate the degree of matching of the current inputs at line 118 to the left hand side of rule three and supply that degree of matching to the defuzzification block 164. As the defuzzification block 164 also receives the output of rule three, the matching may be multiplied by the output of rule three. The pointer corresponding to rule six causes the left hand side of rule six to be supplied to the run time interpreter 160 such that the block 162 calculates the degree of matching of rule six with the current values of the state variables. Block 162 supplies that degree of matching to block 164 which also receives the output of rule six. Accordingly, the defuzzification height method block 164 may supply a controller output on line 126 corresponding to y* as shown. This calculation corresponds to equation 41 discussed above. It will be appreciated that, although two rules had to be executed in order to provide the controller output at line 126, the structure of fuzzy logic controller 110 avoids executing any rules which have a zero output at the particular state space corresponding to the current conditions.

Although the rule base 156 might be constructed such that the pointers from pointer memory 150 are used for directly addressing all portions of rule, it is advantageous to use a rule table 166 within memory 156 and a separate termset table or memory 168. The rule table 166l has n+1 columns with the right column storing the output for a particular rule, each row corresponding to that rule. To use indirect addressing for conserving space, each of the memory locations with table 166 other than the right column corresponding to addresses within termset memory or table 168. For example the block 170 would refer to the address for very low values of the first state variable. Other than the right-most column of rule table 166, each column relates to a particular state variable. Thus, block 170 having the address corresponding to a very low value of the first state variable means that rule one (top row of table 166) includes a very low first state variable as part of its left hand side. Instead of storing the actual values for a very low first state variable in location 170, the location 170 provides the address for location 172, the correspondence between memory location 170 and memory location 172 being indicated by the line 174. The memory location 172 would have the termset data relative to very low values of the first state variable. Assuming the triangular distribution for the termsets as previously used, block 172 would have data corresponding to the three real-valued numbers (two for the extremes of the characteristic function of very low values of the first state variable and one for the mid-point where the characteristic function has a value of one). Each of the rows of termset table 168 corresponds to particular state variable and different locations within each row correspond to different terms of the termset for that variable.

When a pointer is supplied by pointer table or memory 154 to the rule table 166, the right hand side of the rule is supplied by table 166 to the defuzzification block 164. The table 166 further addresses the various termsets within termset table 168 corresponding to that rule such that the left hand side of the rule is supplied to block 154. The calculations corresponding to blocks 120, 158, 160, 162, and 164 may be performed with a microprocessor.

Assuming that the controller of 110 is made with three state variables (n=3), five termsets (t=5) and eight termsets for a rule out ($t_y$=8), calculations show that this would increase the need for storage by 2,950 bytes over a regular interpretative fuzzy logic controller. However, this arrangement decreases the number of rule evaluations by almost two orders of magnitude (from 125 to a maximum of 8 and an average of 3). Therefore, the arrangement of FIG. 20 may provide faster operation for a given amount of processing power than a conventional interpretative fuzzy logic controller.

As will be appreciated, the arrangement of FIG. 20 may be most suitable for certain applications, whereas the arrangement of FIG. 3 (either MOM or approximate HM) may be more suitable for other applications.

Summary of the Definition

LHS Left Hand Side of a production rule (usually representing a conjunction of conditions that must be satisfied to assert the rule conclusion)

RHS Right Hand Side of a production rule (usually representing the conclusion or action to be taken).

$\mu_a(u)$ is the membership function (or membership distribution) that defines the fuzzy set A on the universe of discourse U, composed of a collection of elements u.

$r_i$ is a fuzzy production rule (fuzzy rule for short) that provides a (fuzzy) mapping between a state space and an action space, i.e.:

$$r_i : X_i \to Y_i$$

i is the index for the production rules in the rule base R. ($1 \leq i \leq m$).

R is the rule base, i.e., the union of all rules:

$$r = \bigcup_{i=1}^{m} r_i$$

$\bar{I}$ is the input vector. $|I|=n$ $$\bar{I} = [I_1, I_2, \ldots, I_n]$$

$\bar{X}_i$ is the ith state vector. (LHS of rule $r_i$).

$$|X_i| = n$$
$$\bar{X}_i = [X_{i,1}, X_{i,2}, \ldots, X_{i,n}]$$

j is the index for the input vector elements.

($1 \leq j \leq n$)

$I_j$ is the jth element of the input vector.
$X_{ij}$ is the jth element (state variable) of the ith stator vector.
$Y_i$ is the ith action, (RHS of rule $r_i$).
$\vee$ is the supremum (maximum) operator over all elements indexed by i.
$\wedge$ is the minimum operator over all elements indexed by j.
$\Pi(X_{i,j}|I_j)$ is the degree of matching between the reference value of state variable $X_{ij}$ and the jth input vector element.

$$\prod(X_{i,j} | I_j) = \bigvee_{x_j} (\min[\mu X_{i,j}, (x_j), \mu I(x_j)])$$

$\lambda_i$ is the degree of matching of the LHS of rule $r_i$ with the input. It is also the degree of applicability of rule $r_i$ RHS to the total output.

$$\lambda_i = \bigwedge_j \prod (X_{i,j} | I_j)$$

$\lambda_{i^*}$ is the degree of matching of the LHS of the dominant rule $r_{i^*}$ with the input i* index used to denote the dominant rule $r_{i^*}$.

y* output of the defuzzification (crisp value in the action space).

Conclusion

Although specific arrangements and constructions have been shown herein, it is to be understood that these are for illustrative purposes only. Various modifications and adaptations will be apparent to those of skill in the art. Accordingly, the scope of the present invention should be determined by reference to the claims appended hereto.

What is claimed is:

1. A compiled fuzzy logic control system for controlling a process, comprising:
   means for sensing at least two continuously defined state variables of the process;
   means for receiving the sensed state variables from the sensing means;
   a memory having a look-up table stored therein at a plurality of memory locations, the look-up table being a compilation of values derived from executing a fuzzy logic rule base for the sensed state variables, such that each of said plurality of memory locations stores a value representative of an output derived from an operation of the fuzzy logic rule base, wherein a portion of the stored values are representative of the output from executing a single corresponding rule of the fuzzy logic rule base and other stored values are dependent on the outputs from executing a corresponding plurality of rules of the fuzzy logic rule base;
   means for generating an address for the sensed state variables to a location in the look-up table of the memory;
   means for reading the look-up table in the memory location corresponding to the generated address and outputting the stored value derived from executing the fuzzy logic rule base therefrom; and
   actuating means coupled to the reading means for receiving the stored value and outputting a control action to the process in accordance with the stored value derived from executing the fuzzy logic rule base.

2. The compiled fuzzy logic control system of claim 1 wherein each stored value is representative of an output from executing a single corresponding rule of the fuzzy logic rule base.

3. The compiled fuzzy logic control system of claim 1, wherein each memory location corresponds to a partition in a state space for the sensed state variables, in which a corresponding rule is dominant.

4. The compiled fuzzy logic control system of claim 3 wherein boundaries between adjacent partitions are defined by points of intersection between adjacent terms in a termset.

5. The compiled fuzzy logic control system of claim 1 wherein each stored value is representative of a means of maxima defuzzification.

6. The compiled fuzzy logic control system of claim 1 wherein a portion of the of said memory corresponds to a partition in state space in which a corresponding rule is the only rule with a non-zero output and other of said memory locations each correspond to a partition in state space where each of a corresponding plurality of rules has a non-zero output.

7. The compiled fuzzy logic control system of claim 6 wherein boundaries between adjacent partitions are defined by points at which a characteristic function of a term of a termset becomes zero.

8. The compiled fuzzy logic control system of claim 1 wherein each stored value is representative of an approximate height method defuzzification.

9. A compiled fuzzy logic control system for controlling a process, comprising:
   means for sensing at least two continuously defined state variables of the process;
   means for receiving the sensed state variables from the sensing means;
   a rule base having fuzzy logic rules stored therein, the fuzzy logic rules corresponding to the state variables;

a compilation memory having a look-up table stored therein at a plurality of memory locations, each of said plurality of memory locations having one or more pointers, each pointer corresponding to each rule from said rule base which has a non-zero output when the state variables have values corresponding to the address of that memory location;

means for generating an address for the sensed state values and reading out at least one pointer from the compilation memory;

means for executing the rules corresponding to the read out of the pointers;

means for defuzzifying outputs from the executed rules by using a height method and providing a controller output thereof; and actuating means for receiving the controller output and outputting a control action to the process in accordance with the controller output.

10. The compiled fuzzy logic control system of claim 9 further comprising means for calculating the degree of matching of a left hand side of a rule and the state variables.

11. The compiled fuzzy logic control system of claim 10 wherein said means for executing executes all rules having a non-zero output for given values of the state variables.

12. The complied fuzzy logic control system of claim 11, wherein said address generating means determines which of the plurality of partitions have state variables located therein and selects an address corresponding to that partition.

* * * * *